(12) United States Patent
Bolton et al.

(10) Patent No.: US 8,902,966 B2
(45) Date of Patent: Dec. 2, 2014

(54) VIDEO DECODING DEVICE

(75) Inventors: Martin Bolton, Blagdon (GB); Michele Carrano, Catania (IT)

(73) Assignees: STMicroelectronics (Research & Development) Limited, Marlow Bucks (GB); STMicroelectronics S.R.L., Agrate Brianza (MB) (IT)

( * ) Notice: Subject to any disclaimer, the term of this patent is extended or adjusted under 35 U.S.C. 154(b) by 1405 days.

(21) Appl. No.: 10/580,762

(22) PCT Filed: Nov. 23, 2004

(86) PCT No.: PCT/GB2004/004924
§ 371 (c)(1),
(2), (4) Date: Feb. 21, 2007

(87) PCT Pub. No.: WO2005/055611
PCT Pub. Date: Jun. 16, 2005

(65) Prior Publication Data
US 2007/0160151 A1    Jul. 12, 2007

(30) Foreign Application Priority Data
Nov. 26, 2003  (EP) .................................. 03257455

(51) Int. Cl.
| H04N 7/12 | (2006.01) |
| H04N 11/02 | (2006.01) |
| H04N 11/04 | (2006.01) |
| G06K 9/36 | (2006.01) |
| G06K 9/46 | (2006.01) |
| H04N 19/42 | (2014.01) |

(52) U.S. Cl.
CPC ................................. *H04N 7/26702* (2013.01)
USPC ............ 375/240.01; 375/240.02; 375/240.16; 375/240.25; 382/236

(58) Field of Classification Search
CPC .................................................. H04N 7/26702
USPC ............ 375/240.25, 240.26, 240.02, 240.01; 382/268
See application file for complete search history.

(56) References Cited

U.S. PATENT DOCUMENTS

| 5,510,857 A | 4/1996 | Kopet et al. |
| 5,608,459 A | 3/1997 | Hashimoto et al. |
| 5,646,688 A | 7/1997 | Hashimoto et al. |
| 5,699,460 A | 12/1997 | Kopet et al. |

(Continued)

FOREIGN PATENT DOCUMENTS

| JP | 7177523 A | 7/1995 |
| JP | 2003152546 A | 5/2003 |

OTHER PUBLICATIONS

Written Opinion of the International Searching Authority from corresponding International Application No. PCT/GB2004/004924. Filed Nov. 23, 2004.

(Continued)

*Primary Examiner* — Hee-Yong Kim
(74) *Attorney, Agent, or Firm* — Allen, Dyer, Doppelt, Milbrath & Gilchrist, P.A.

(57) ABSTRACT

A video decoding circuit comprising: a first video data processor; a second video data processor; and a connection connecting the first video data processor and the second data processor; wherein the first video data processor is arranged to receive a first signal comprising encoded video data, process the first signal to provide a second signal and output the second signal. The first video data processor being arranged to process the first signal dependent on at least part of the received first signal. The second video data processor is arranged to receive at least a part of the second signal, process the at least a part of the second signal to provide a third signal, and output the third signal, the second and third signals comprising a decoded video image stream. The second video data processor is arranged to process the at least part of the second signal dependent on at least part of the at least part of second signal.

57 Claims, 17 Drawing Sheets

(56) References Cited

U.S. PATENT DOCUMENTS

| | | | |
|---|---|---|---|
| 5,774,206 | A | 6/1998 | Wasserman et al. |
| 5,812,791 | A | 9/1998 | Wasserman et al. |
| 6,263,019 | B1* | 7/2001 | Ryan .................. 375/240.02 |
| 6,415,345 | B1* | 7/2002 | Wu et al. .................. 710/305 |
| 6,573,846 | B1* | 6/2003 | Trivedi et al. .................. 341/67 |
| 2003/0185306 | A1* | 10/2003 | MacInnis et al. ........ 375/240.25 |
| 2003/0202705 | A1* | 10/2003 | Sun .............................. 382/236 |
| 2003/0206664 | A1* | 11/2003 | Gomila et al. ................ 382/268 |
| 2004/0017853 | A1* | 1/2004 | Garrido et al. .......... 375/240.16 |

OTHER PUBLICATIONS

International Search Report from corresponding International Application No. PCT/GB2004/004924. Filed Nov. 23, 2004.

Pirsch P. et al: "VLSI Architectures for Video Compression—A Survey" Proceedings of the IEEE, IEEE. New York, us, vol. 83, No. 2, Feb. 1, 1995, pp. 220-246, XPOO0501242.

Bursky D: "Image-Processing Chip Set Handles Full-Motion Video" Electronic Design, Penton Publishing, Cleveland, OH, US, vol. 41, No. 9, May 3, 1993, pp. 117-120, XPOO0362680.

Yang K-M et al: "Design of a Multi-Function Video Decoder Based on a Motion-Compensated Predictive-Interpolative Code" Proceedings of the SPIE, SPIE, Bellingham, VA, US, vol. 1360, No. Part 3, Oct. 1, 1990, pp. 1530-1539, XPOO9987352.

Notification of Reason for Rejection and the English translation of the Notification of Reason for Rejection from related Japanese Application No. 2006-540599 dated Jul. 29, 2011.

\* cited by examiner

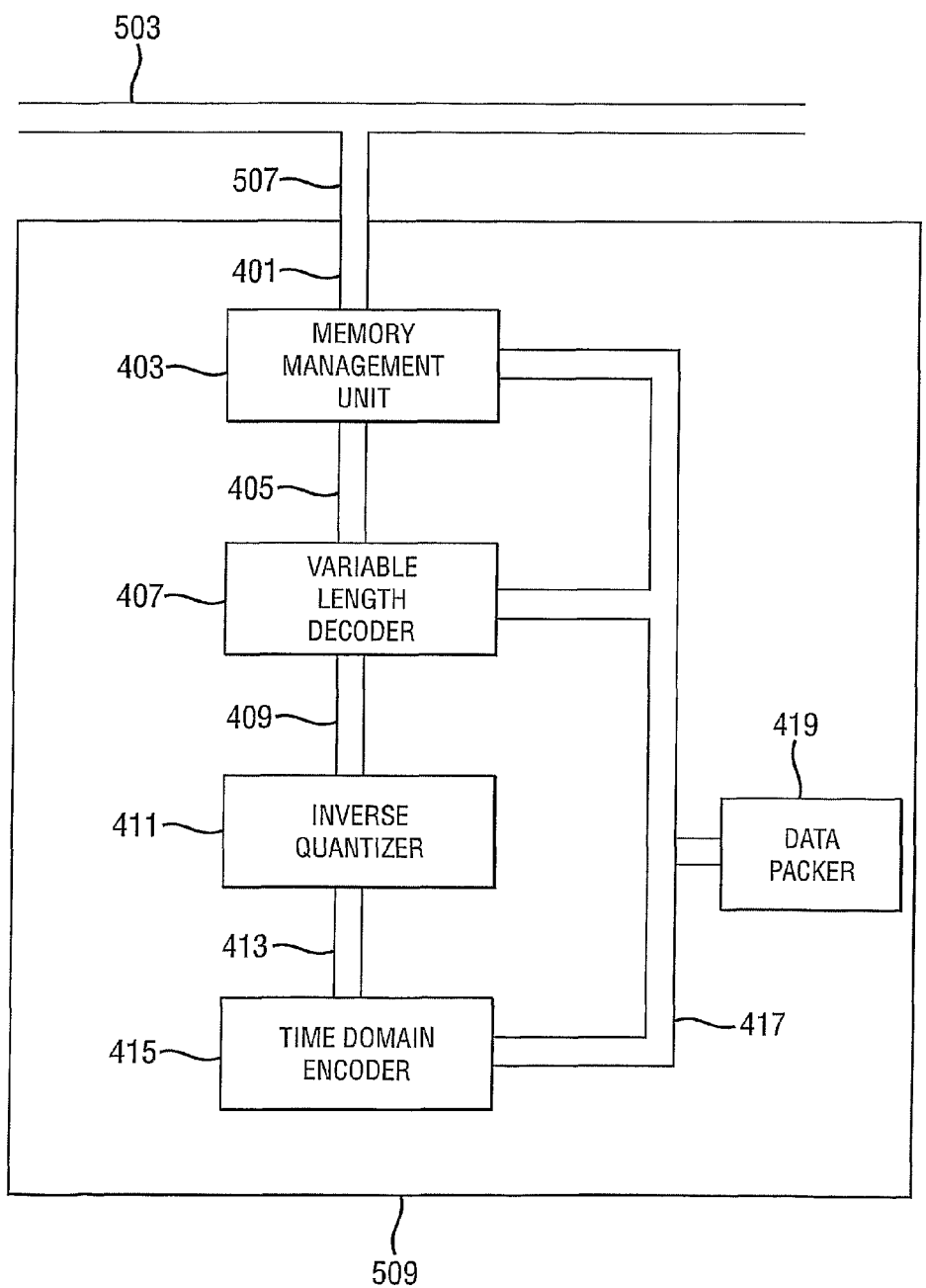

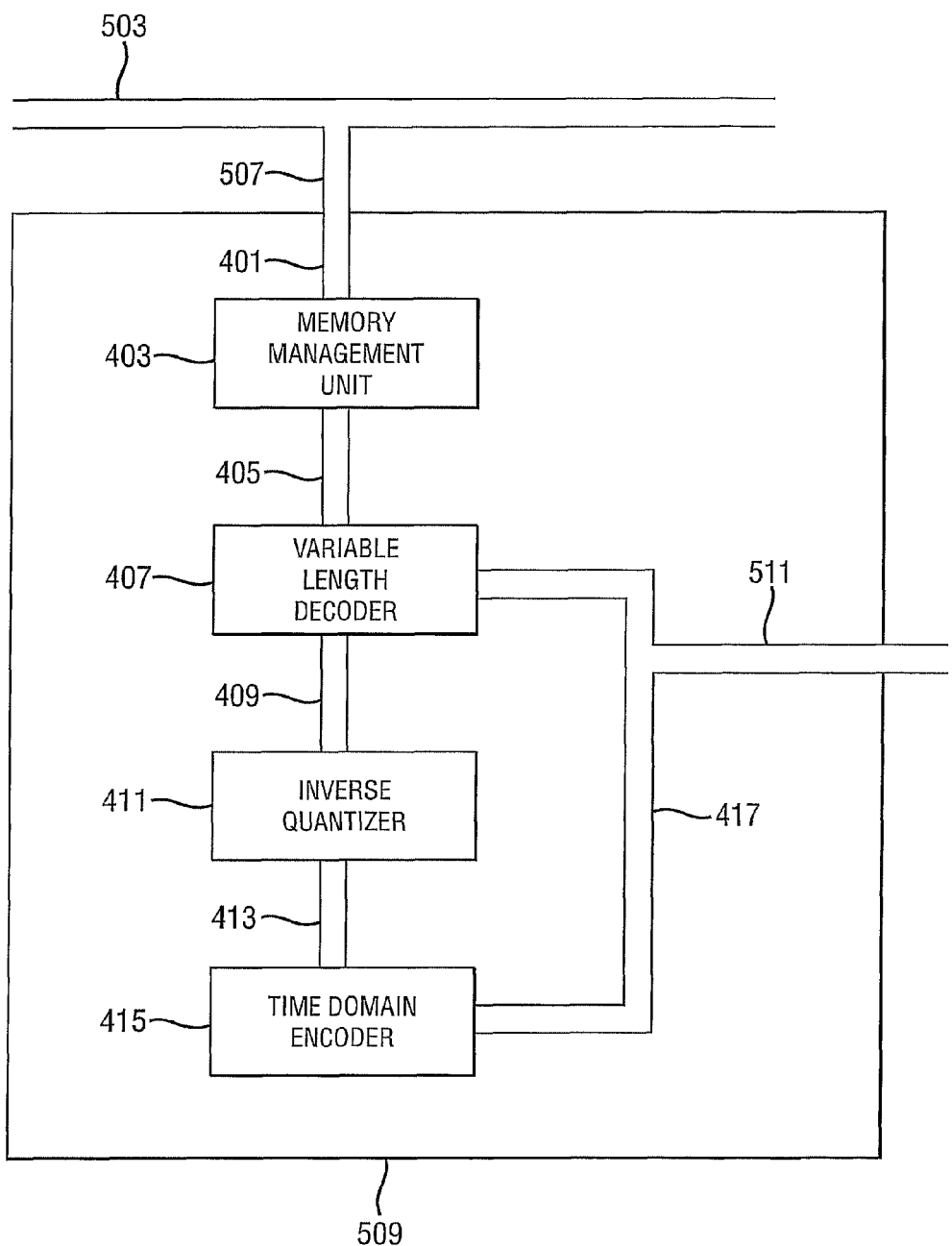

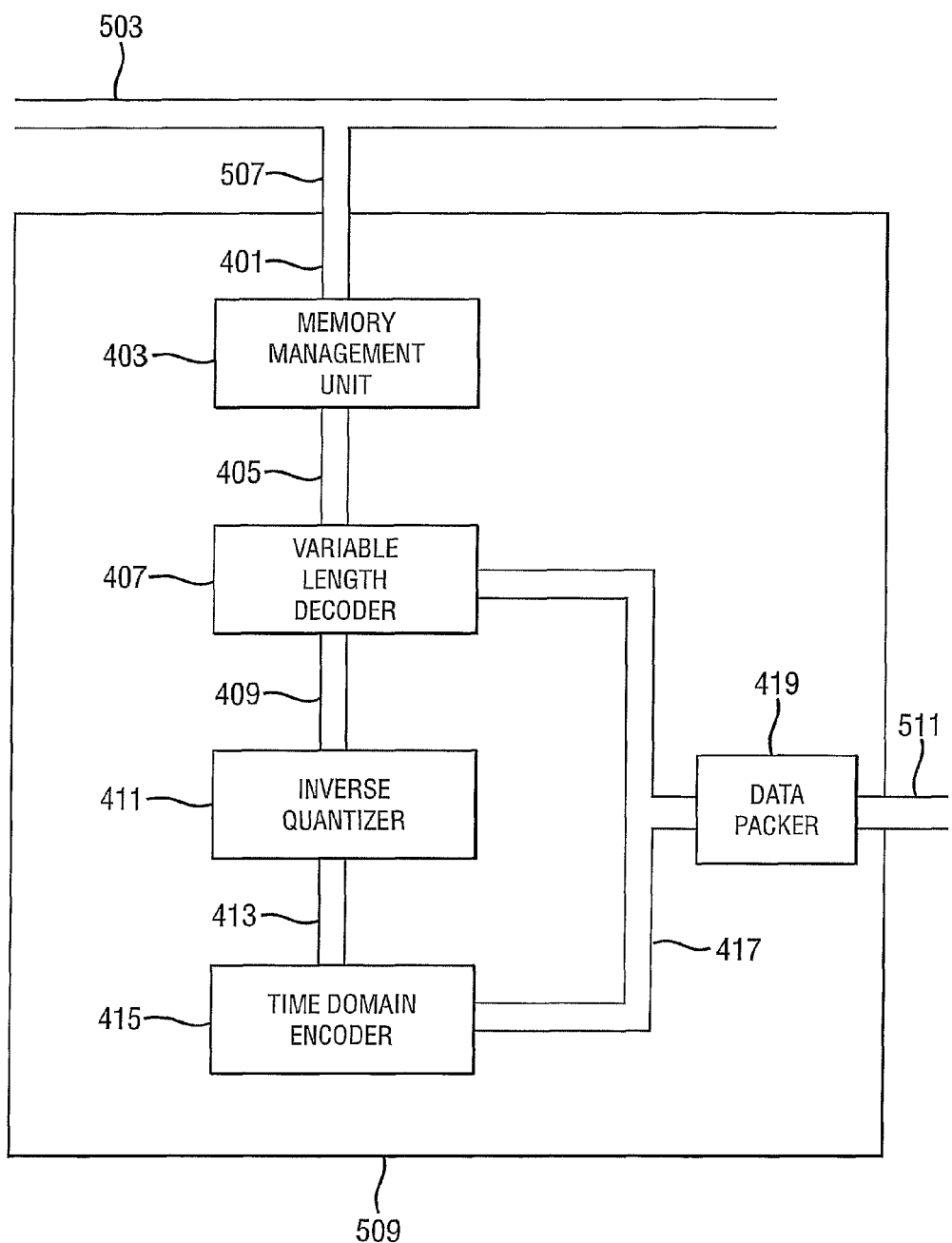

FIG. 9 (Contd.)
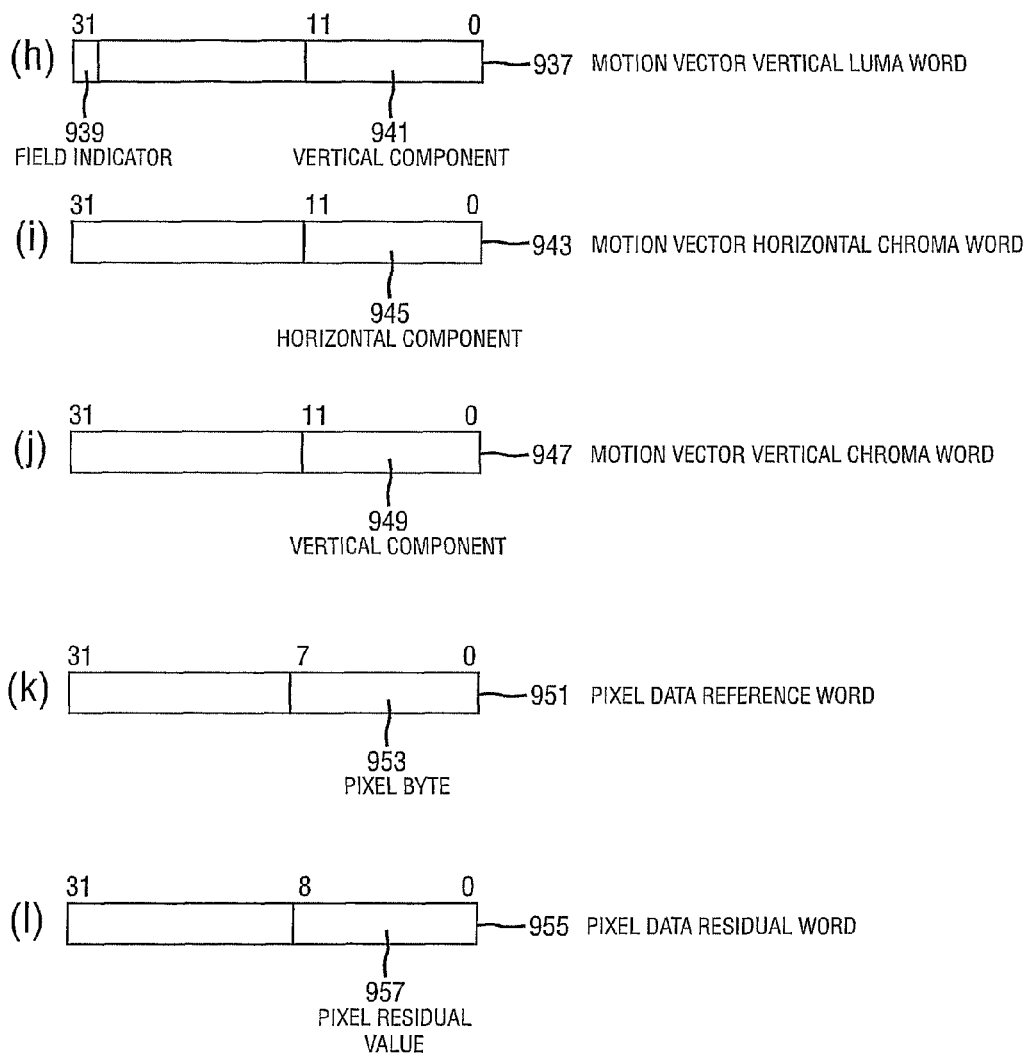

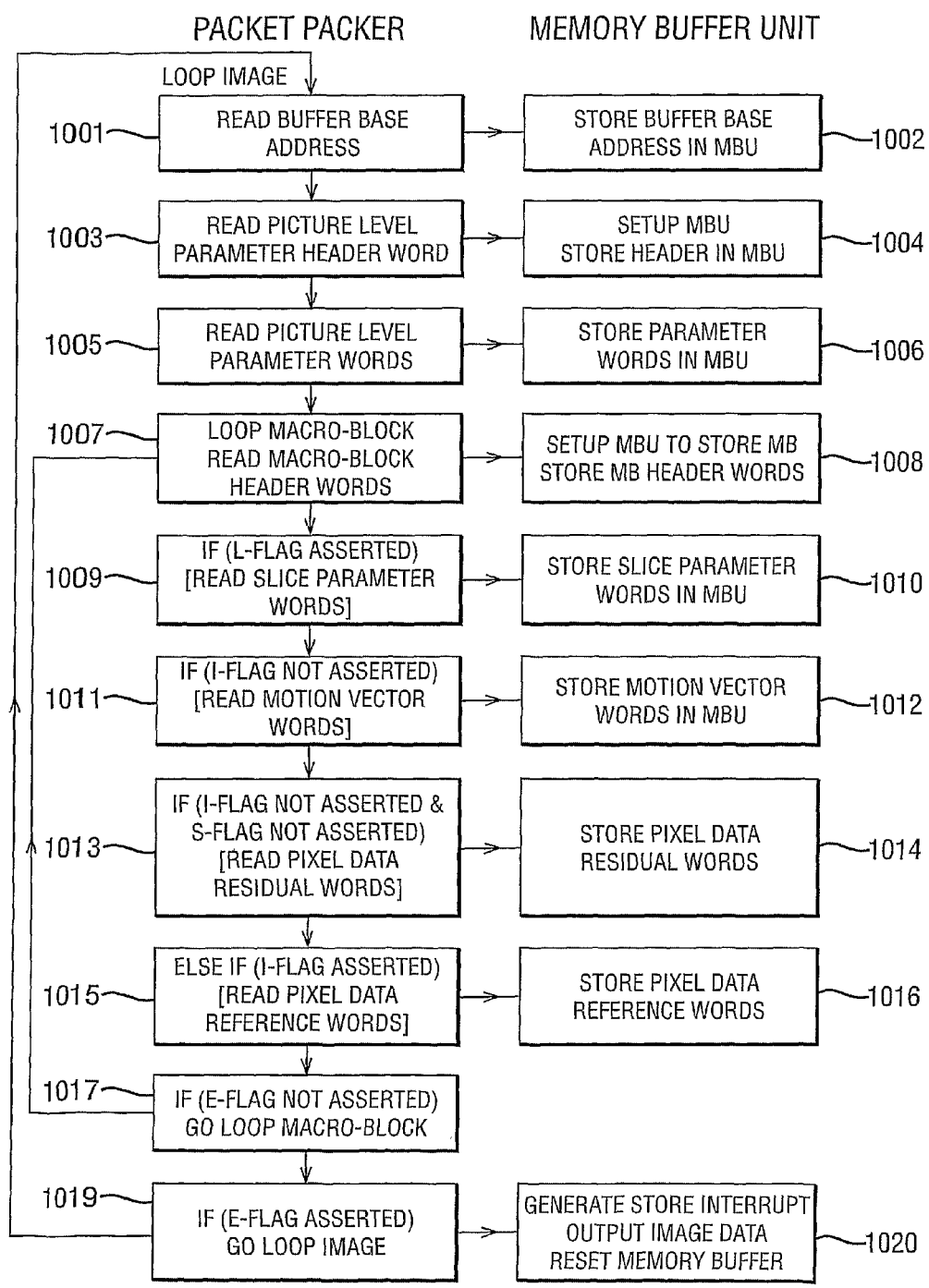

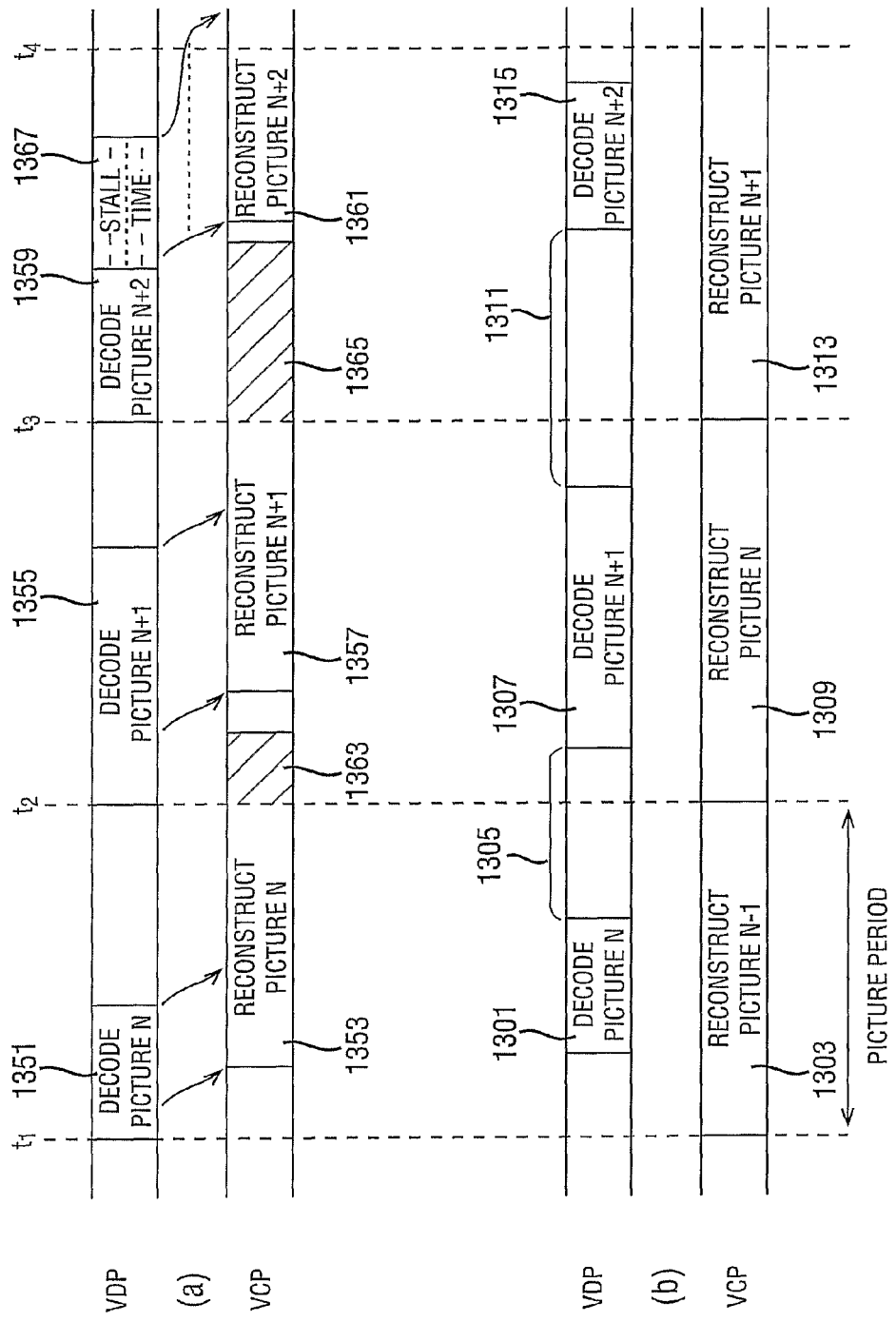

VIDEO DECODING DEVICE

BACKGROUND OF THE INVENTION

1. Field of the Invention

The present invention relates to a video decoding device and in particular but not exclusively to a video decoding device for decoding Moving Picture Experts Group (MPEG) and associated encoded video types.

2. Discussion of the Related Art

Digital video compression is used in many different environments and has become the first choice in many different situations. Three such environments are: broadcasting and the DVB (Digital Video Broadcasting) standard; storage of video data and the DVD (Digital Versatile Disc) standards; and internet node to node communication using standards such as MPEG-4 encoding.

Traditionally most of these coders and decoders (Codecs) associated with these are based on the original MPEG (Moving Picture Experts Group—the international standards organization/international electro-technical commission video decoding and encoding methods) standards, commonly known as MPEG2. Codecs and the coding/decoding algorithms powering them have improved since the original algorithms were set as the standards. These improvements have been incorporated into a series of Codecs which while not being MPEG standards still use MPEG type segmentation and compression steps.

MPEG and MPEG type codecs treat video data which consists of a series of images—these images are known as pictures. There are two types of picture, a frame picture or a field picture. A frame picture is further subdivided into a pair of fields, each field comprising alternate rows of a scanned image. A field picture contains the rows of image data from a single field. Each picture can be treated by the codec as a reference picture or as a non reference picture.

All of these MPEG type schemes encode and decode with reference to the frame or field pictures and in particular to a specific reference or multiple reference pictures. In its most basic form this involves encoding an initial reference picture followed by a series of non-reference pictures. In practice however the distinction between reference and non-reference pictures is not as simple. Reference pictures can be both intra (I) pictures and/or P pictures. An I picture is a picture which is encoded without reference to any other picture. Both P and B pictures are encoded however using data from one or more other pictures. B pictures are not used to encode other pictures.

The I pictures are broken down into a series of macro blocks (MB). The blocks are then processed. The B and P pictures search the macro blocks from the P and I pictures to find similar blocks to those in the B and P pictures. The B and P pictures are then encoded in terms of macro blocks which differ from the macro blocks of the I and P pictures in terms of content and also position.

Decoding schemes perform the reverse of the encoding scheme, that is, recreating the original P and I pictures, and then using the I and P pictures and extra P and B picture data to reconstruct the original P and B pictures.

Current commercially usable video decoding chip solutions have been designed primarily to decode MPEG2 coded video streams. These commercially available solutions are therefore MPEG2 d optimized and are not easily capable of being modified to decode video streams encoded using any other standard.

Known flexible decoders are available but have been based on the general processing unit (GPU) such as those used within personal computers. These flexible decoders perform the whole decoding process using instructions stored in memory external to the processor, which is selected and loaded dependent on the video standard required to be decoded. These GPU's are not d optimized to perform video decoding, consume a large amount of power and produce a large amount of heat when compared against the previous MPEG2 video processing units used. The GPU solution is also expensive compared against the MPEG2 video processing units previously used and therefore making the cost of production of a flexible video decoding system expensive.

SUMMARY OF THE INVENTION

It is an aim of the embodiments of the present invention to address or at least partially mitigate one or more of the problems discussed previously.

Embodiments of the present invention may provide a single device capable of being flexible enough to decode a range of standards.

There is provided, according to the invention, a video decoding circuit comprising: a first video data processor; a second video data processor; and a connection connecting said first video data processor and said second data processor; wherein said first video data processor is arranged to receive a first signal comprising encoded video data, process said first signal to provide a second signal and output said second signal, said first video data processor being arranged to process said first signal dependent on at least part of said received first signal, and said second video data processor is arranged to receive at least a part of said second signal, process said at least a part of said second signal to provide a third signal, and output said third signal, said second and third signals comprising a decoded video image stream, and said second video data processor is arranged to process said at least part of said second signal dependent on at least part of said at least part of second signal.

The first video data processor may be arranged to variable length decode said received first signal to produce a decoded first signal.

The first video data processor may be arranged to separate said first signal data into at least a first part and a second part, wherein said first part may comprise at least one of: pixel data; residual data, and wherein said second part may comprise motion vector data.

The first video data processor may be arranged to inverse quantize said first part of said first signal.

The first video data processor may be arranged to spatial domain transform said first part of said first signal.

The first video data processor may be arranged to combine said spatial domain transformed and/or inverse quantized first part of said first signal with said second part of said first signal.

The second video data processor may be arranged to interpolate at least a first part of said second signal.

The second video data processor may be arranged to interpolate at least a first part of said second signal using one of horizontal and vertical interpolation.

The circuit may further comprise a memory, said second video data processor may be arranged to store said interpolated part of said second signal in said memory.

The second video data processor may be arranged to interpolate said stored interpolated first part of said second signal using the other one of horizontal and vertical interpolation.

The second video data processor may be arranged to combine said interpolated part of said second signal and a further part of said second signal, wherein said interpolated part of said second signal may comprise an estimated macro block, and said further part of said second signal may comprise residual error data.

The second video data processor may be arranged to filter at least one of said at least one part of said second signal and said third signal.

The filter may comprise at least one of a de-ringing filter and a de-blocking filter.

The connection may comprise a bus connecting said first and second video data processors.

The circuit may further comprise a memory device, said memory device may possibly be connected to said bus.

The first video data processor may have an output for outputting said second signal to said memory device via said bus.

The second video data processor may have an input for receiving said parts of said second signal from said memory device via said bus.

The connection may comprise a data interconnect, said data interconnect possibly directly connecting said first video data processor and said second video data processor.

The first video data processor may have an output for outputting said second signal to said data interconnect.

The second video data processor may have an input for receiving said parts of said second signal from said data interconnect.

The second video data processor may receive part of said parts of said second signal from said data interconnect and part of said parts of said second signal from said bus.

The first signal may be at least one of: a MPEG2 encoded video stream; a H.263 encoded video stream; a RealVideo9 encoded video stream; a Windows media player encoded video stream; a H.264 encoded video stream.

The second signal may comprise at least one of: buffer base address word; picture level parameter header word; picture level parameter word; macro-block header word; slice parameter word; motion vector horizontal luma word; motion vector vertical luma word; motion vector horizontal chroma word; motion vector vertical chroma word; pixel data reference word and pixel data residual word.

The first video data processor may comprise a data packer.

The second video data processor may comprise a data packer.

The data packer may comprise: an input, said input may be arranged to receive said second signal, said second signal may comprise data words; means for ordering said data words; and an output, said output may be arranged to transmit data packets comprising ordered data words.

An integrated circuit may comprise a circuit as detailed above.

The first video data processor may comprise a very long instruction word processor.

The very long instruction word processor may be adapted to process said first signal further dependent on a set of instructions stored in a memory.

The second video processor may comprise a programmable processor.

According to a second aspect of the invention there is provided a video decoding method comprising the steps of: receiving at a first video data processor a first signal comprising encoded video data, processing said first signal to provide a second signal dependent on at least part of said first signal, outputting said second signal, receiving at least a part of said second signal at a second video data processor, processing said at least part of said second signal to provide a third signal dependent on at least part of said second signal, and outputting said third signal, wherein said second and third signals comprise a decoded video image stream.

The step of processing said first signal may comprise the step of variable length decoding said first signal.

The step of processing said first signal may comprise the step of separating said first signal into at least a first part and a second part, wherein said first part comprises at least one of: pixel data; residual data, and wherein said second part comprises motion vector data.

The step of processing said first signal further may comprise the step of inverse quantizing said first part of said first signal.

The step of processing said first signal further may comprise the step of spatial domain transforming said first part of said first signal.

The step of processing said first signal may further comprise the step of combining said spatial domain transformed and/or inverse quantized first part of said first signal with said second part of said first signal.

The step of processing at least a part of said second signal may further comprise the step of interpolating at least a first part of said second signal.

The step of interpolating at least a first part of said second signal may comprise the step of interpolating at least a first part of said second signal using one of horizontal and vertical interpolation.

The step of interpolating may further comprise storing said interpolated part of said second signal.

The step of interpolating further may comprise interpolating said interpolated part of said second signal using the other one of horizontal and vertical interpolation.

The step of processing at least part of said second signal may further comprise combining said interpolated part of said second signal and a further part of said second signal, wherein said interpolated part of said second signal may comprise an estimated macro block, and said further part of said second signal may comprise residual error data.

The step of processing at least a part of said second signal may further comprise the step of filtering, wherein said step of filtering may comprise at least one of the steps: de-ringing filtering and de-blocking filtering.

The step of outputting said second signal may further comprise the step of storing said second signal in a memory.

The step of receiving at least part of said second signal may comprise receiving said at least part of said second signal directly from the first video data processor.

The step of receiving at least part of said second signal may comprise receiving a first part of said at least part of said second signal directly from said first video data processor and a second part of said at least part of said second signal from said memory.

The step of processing said first signal may further comprise the step of packetizing said second signal.

The step of processing said second signal may further comprise the steps of: packetizing said at least part of said second signal; storing said at least part of said second signal in a memory; and receiving said at least part of said stored second signal from said memory.

BRIEF DESCRIPTION OF DRAWINGS

For a better understanding of the present invention and how the same may be carried into effect, reference may now be made by way of example only to the accompanying drawings in which:

FIG. 5b shows a schematic view of a second arrangement for a decoding video processor as shown in FIGS. 4a and 4b;

FIG. 5c shows a schematic view of a third arrangement for a decoding video processor as shown in FIGS. 4a and 4b;

FIG. 5d shows a schematic view of a fourth arrangement for a decoding video processor as shown in FIGS. 4a and 4b;

FIG. 10 shows a block diagram detailing the processes of the data packer as shown in FIG. 8;

FIG. 13 shows a timing diagram explaining the 'synchronous' and 'asynchronous' connection embodiments between the video decoding processor and the video co-processor as shown in FIG. 4b.

DETAILED DESCRIPTION OF EMBODIMENTS OF THE PRESENT INVENTION

Figure 1:
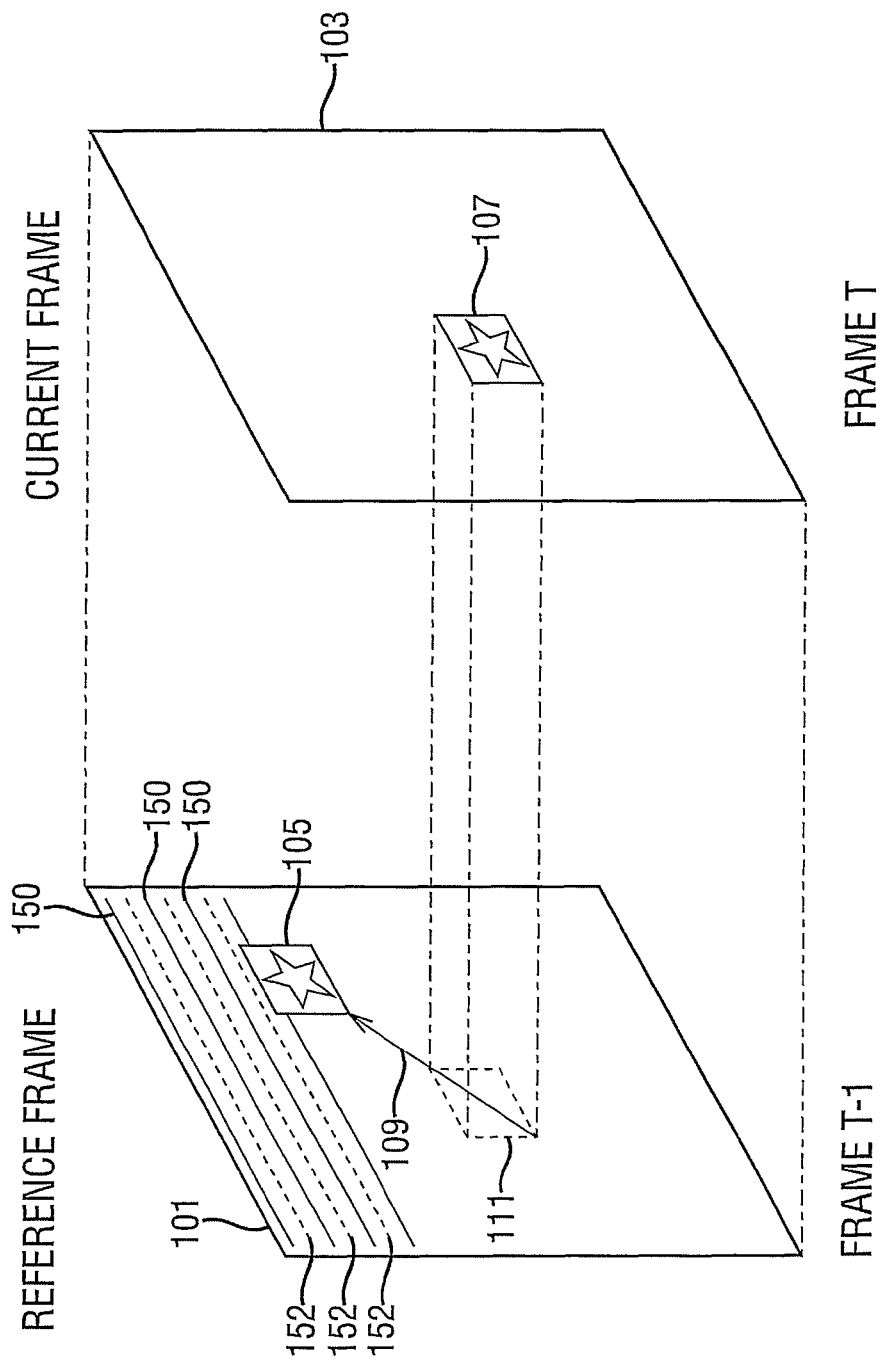
FIG. 1 shows a pair of frames from a sequence of frames forming a moving image.

Reference is made to FIG. 1, which shows a pair of frame pictures demonstrating an MPEG type encoding system. As detailed earlier the generic MPEG type compression system involves sampling video as a series of pictures 101, 103. These frame pictures may, in embodiments of the invention, be further divided into field pictures 150, 152. In the embodiment a frame picture has two field pictures, each field picture comprising alternate lines of the frame picture.

The picture is further divided into a series of macro-blocks (MB), of which one macro block 105 is shown. The macro-block contains sampled luma (brightness) and chroma (color) data. Typically the chroma data is sub sampled. Thus in an embodiment where the macro block is 16 by 16 pixels large, there are 256 luma samples and a smaller number of chroma samples. The macro blocks are further decomposed into smaller blocks, the number and structure of which is determined by the type of codec used. For example in MPEG-2 encoding each macro-block is subdivided into six blocks. Four blocks each of which is 8 by 8 pixels large contain the luma data. Two further blocks also 8 by 8 pixels large contain the sub-sampled chroma data. Other coding standards may for instance use blocks 8 by 4 pixels, or 4 by 8 pixels large. Therefore in a full screen image picture of 720×480 pixels (NTSC National Television Systems Committee) or 720×576 (PAL Phase Alternating Line) pixels, there are many macro blocks to be encoded in every pictures.

Figure 2:
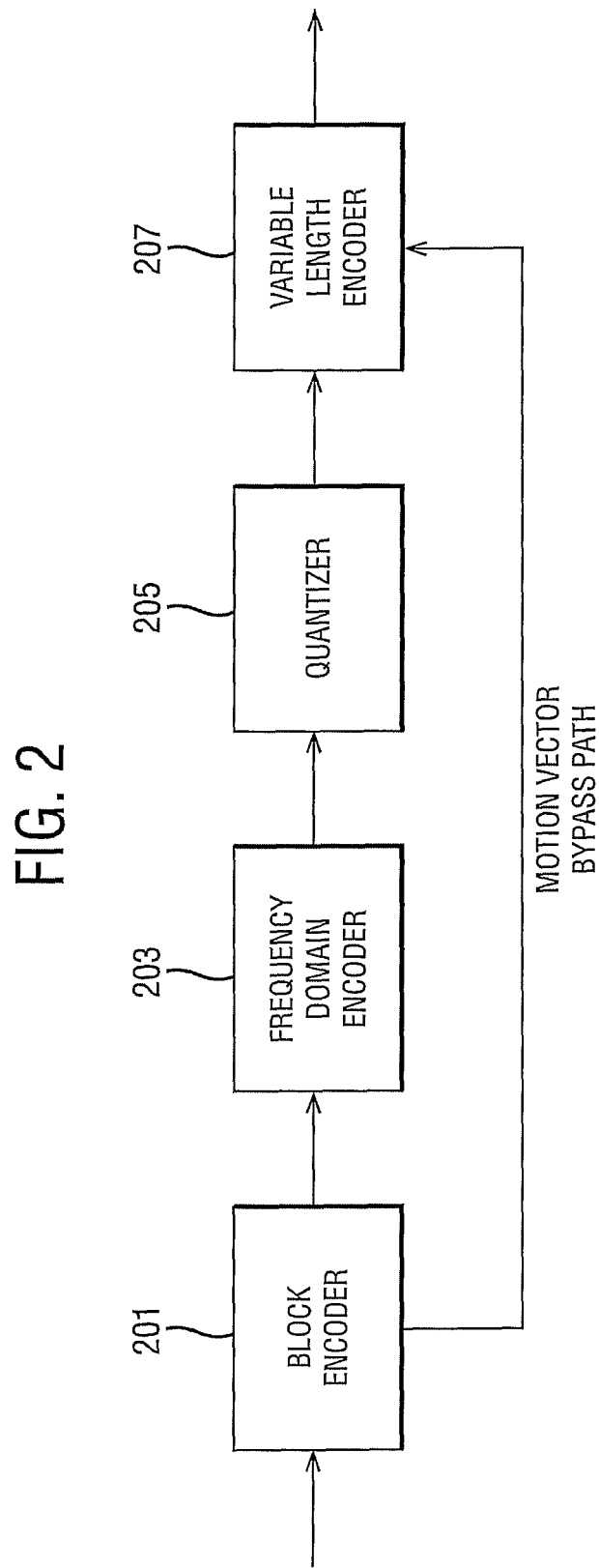
FIG. 2 shows a schematic view of a MPEG type encoder.

With reference to FIG. 2, the steps of a MPEG type compression system will be further detailed in order to understand the invention better. The MPEG type coder comprises the items: block encoder 201; frequency domain encoder 203; quantizer 205; and variable length encoder 207.

The flow of data is such that the image data is passed initially to the block encoder 201. After processing by the block encoder 201, data is passed to the frequency domain encoder 203. After frequency coding 203 the data is then passed to the quantizer 205. After quantization the data is then passed to the variable length encoder 207. The output of the variable length encoder 207 is the MPEG type video image code.

I pictures 101 and P, B pictures 103 follow slightly different processes in their encoding methods.

The block encoder 201, in encoding an I picture, samples each macro block (MB) for luma and chroma values as is known in the art. This sampled data is passed to the frequency domain encoder 203. A copy of the sampled I picture data is also stored for P or B picture encoding.

The block encoder 201, in processing a P or B picture uses the stored I or P picture data. The series of macro-block samples of the P or B pictures is searched for against the I or P picture macro-blocks. If a macro-block in the I or P picture is similar to the macro-block in the P or B picture, a 'match' is found. The matched macro-block is encoded using two pieces of information.

The first piece of information is known as the residual data. The residual data is the difference in luma and chroma between the two macro-blocks (107, 105), that is the macro-block in the P or B picture and the matching macro-block in the I or P picture.

The second piece of information created is the block movement predictor, otherwise known as the motion vector. The motion vector 109 as illustrated schematically in FIG. 1 is the spatial difference between the matched macro-blocks. To illustrate the motion vector 109, the macro-block 107 of the P or B picture is mapped onto the I or P picture. The mapped macro-block is referenced by 111. The motion vector 109 shows the difference in position between the mapped macro-block 111 and the I or P macro-block 105. This is purely for illustrative purposes.

The I picture data is passed to the frequency domain encoder 203. The B or P residual data is also passed to the frequency domain encoder 203, whereas the motion vector data is passed directly to the variable length encoder 207.

The frequency domain encoder 203 applies a transform converting the data from each block in the macro-block from the spatial domain to the frequency domain. As is known in the art such transforms may be discrete cosine transforms (DCT), but may also be other known frequency domain transforms. The frequency domain output from the frequency domain encoder 203 is then passed to the quantizer 205.

The quantizer 205 performs a re-sampling of the frequency domain information of block data from the macro-block. This is achieved by dividing the result of the frequency domain encoder by a predetermined number to remove some of the least significant bit values.

The quantized frequency domain data stream is then passed to the variable length encoder 207, whereby the predicted macro-block data is recombined with the motion vector data.

The variable length encoder 207 applies a process which removes redundancy from the bit stream by detecting sequences of 0's or 1's and encoding them into a more efficient form. Variable length coding sequences such as Hoffman or Huffman coding sequences along with others known in the art may be used.

Figure 3:
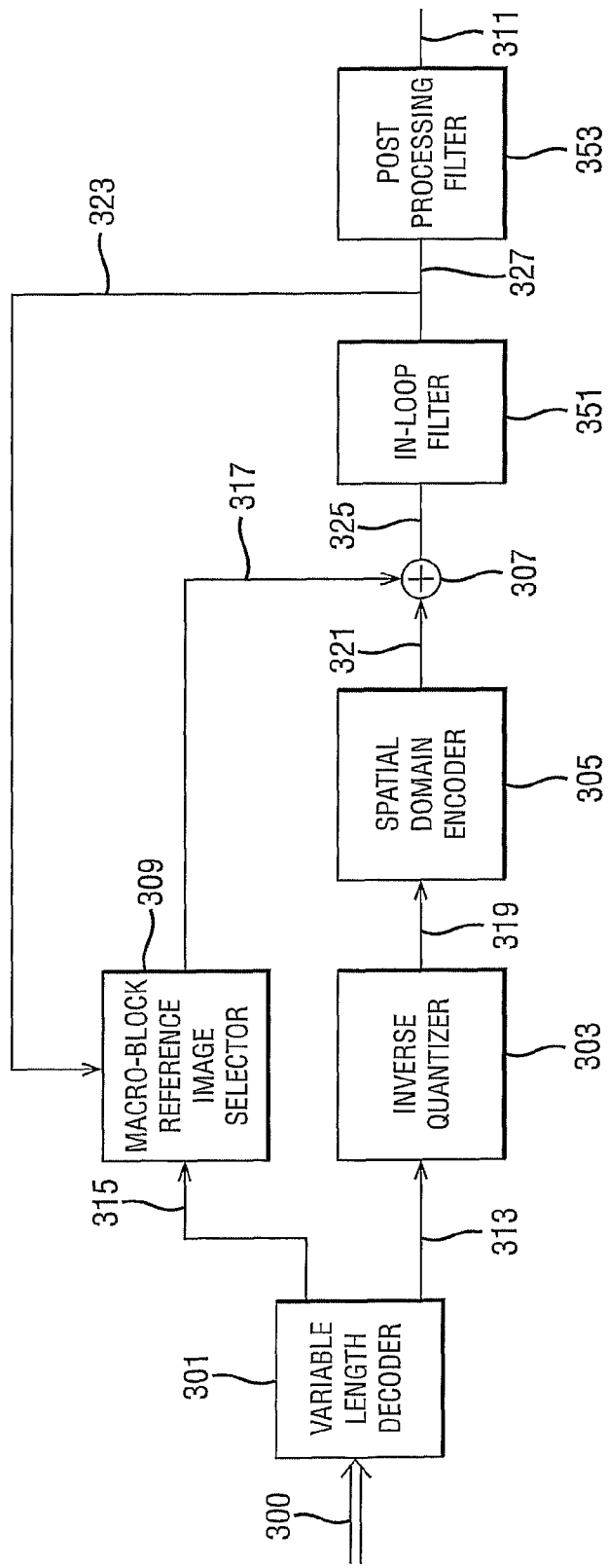
FIG. 3 shows a schematic view of a MPEG type decoder in which embodiments of the present invention can be implemented.

With reference to FIG. 3, the reverse of the encoding process, that of decoding a MPEG type video stream is shown.

The MPEG type decoder comprises a data input 300, a variable length decoder 301, an inverse quantizer 303, a spatial domain encoder 305, an adder 307, a macro-block reference image selector 309, an in-loop filter 351, a post processing filter 353, and an image output 311.

The decoder also comprises a series of interconnects 313, 315, 317, 319, 321, 323, 325 and 327 which connect together the various components of the decoder.

The interconnect 313 connects the variable length decoder 301 to the inverse quantizer 303. The interconnect 319 connects the inverse quantizer 303 to the spatial domain encoder 305. The interconnect 321 connects the spatial domain encoder 305 to the adder 307. The interconnect 315 connects the variable length decoder to the macro-block reference image selector 309. The interconnect 317 connects the macro-block reference image selector 309 to the adder 307. The interconnect 325 connects the output of the adder 307 to the in-loop filter 351. The interconnect 323 connects the output of the in-loop filter to the macro-block selector 309. The interconnect 327 connects the output of the in-loop filter to the input of the post-processing filter 353.

The MPEG type compressed signal is input 300 to the variable length decoder 301.

The variable length decoder (VLD) performs two functions on the initial data stream. The first function is applying an inverse of the variable length encoding algorithm to the data stream.

The variable length decoder 301 also determines the picture type, in other words whether the signal is a I, P or B picture.

If the current picture is a I picture all of the data is passed via interconnect 313 to the inverse quantizer 303. If the current picture is a P or B picture the residual data is passed via interconnect 313 to the inverse quantizer 303, and the motion vector and the prediction mode for the macro-block are passed to the macro-block selector 309 via the interconnect 315.

The inverse quantizer 303 performs the inverse procedure to the quantization unit. In other words the data stream is returned to its original bit length by multiplying the received value by the predetermined number used. The values lost from the least significant bits during the quantization process though can not be restored. This data is passed via the interconnect 319 to the spatial domain transformer 305.

The spatial domain encoder 305 performs a frequency to spatial domain transform on the data, thus bringing the data back into the spatial domain as originally encoded. Known spatial domain transforms include the inverse discrete cosine transform.

The output from the spatial domain encoder 305 is the macro block luma and chroma information as originally encoded, but with some data loss dependent on the value of the quantization originally performed. For the intra (I picture) values the data is the absolute luma and chroma values and for the P or B picture values the data is the relative luma and chroma values.

These values are output to a first input of the adder 307 via the interconnect 321.

In the parallel data flow path, the predicted motion vector information is passed to the macro-block selector 309. This data is used to identify a matched element stored in a previously decoded I or P picture. This matched element is then passed via interconnect 317 to the second input of the adder 307.

The adder 307 for an I picture macro-block outputs only the data passed to it from the spatial domain transformer 305. The adder 307 for a P or B picture outputs the combined values of the selected predicted macro-block element and the residual data output by the spatial domain transformer 305.

Two types of filters are shown in the decoding embodiment shown in FIG. 3. The first type is the in-loop filter 351. The in-loop filter is defined by the type of MPEG stream. Thus, for example, some standards H.263, WMV, Real Video and H.264 have de-blocking filters implemented as part of the decoding.

In some standards there is no requirement for in-loop filtering in which case the in-loop filter functions as a data buffer.

The second type of filter is the post processing filter 353. The post processing filter 353 are not defined by any one standard and can perform a range of filtering functions to improve the picture quality. These filters may be de-blocking, de-ringing or other image enhancement or noise reduction filters. Furthermore these filters where used are applied to data outside of the picture storage loop.

A de-blocking filter as known in the art can be used both as an in-loop and post processing filter. The filter works in the spatial domain. The filter examines the borders between macro-blocks to determine if the image quality between macro-blocks is significantly different. Differences in quantization between macro-blocks can produce boundaries between blocks whereby the same feature or line is not contiguous between macro-blocks. The de-blocking filter attempts to improve the image by examining if the non-contiguous feature has a low or high frequency component. Where the feature is slow moving, and therefore low frequency, it is possible to smooth the difference between the lines and produce a less visible artifact between macro-blocks. A rapidly moving feature though is not smoothed, as this would produce blurring of the feature.

A de-ringing filter is a further adaptive filter which attempts to reduce the effect of harsh quantization. This type of filter is only used by the post processing filter. Harsh quantization of the macro-block removes large amounts of high frequency information. Visually this is seen in the appearance of rings of artefacts centred about a defined feature. This type of artefact is known in the art as mosquito noise. This type of noise can be mitigated by the application of a de-ringing filter which compares the current macro-block against previously calculated ones. It also examines the pixel values in the current macro-block to attempt to mitigate the noise.

Thus for both intra and predicted picture data a series of macro-blocks which when combined would form a total picture is output from the adder 307. Intra and P pictures can then be passed back via the interconnect 323 for storage and used for subsequent predicted picture reconstruction.

As can be seen from the above discussion, there is a potential algorithmic division between data paths once the data has been variable length decoded. Motion vector information and residual data do not interact in the reconstruction of P and B pictures until they are received by the adder/combiner 307. It is therefore possible to separate the processing of these two data paths without requiring data to be transferred between the two processing stages.

This separation of motion vector and residual decoding is more pronounced once the action of interpolation is introduced. As the motion vector may not point to an exact pixel value, but may point to a fractional position such as one half or a quarter of a pixel value away from a whole row or column value, the macro-block selector may be required to carry out an interpolation or re-sampling of image data. In order to carry out this interpolation process, I or P picture data is imported and the interpolator is required to carry out many numerical calculations in order to calculate each interpolated image. In tests the percentage of the time used to run on a general processor unit the motion compensation process part of the decoding of an MPEG data stream can be up to 40% of the whole run time.

Two types of video decoder are described with respect to the present invention. Both types are configurable video decoders and are therefore flexible enough to decode a range of different encoded video data streams.

In the first the separation of the two main processes is carried out by two separate data processors. In the second the two separate data processors are connected by an interconnect between the two.

Figure 4A:
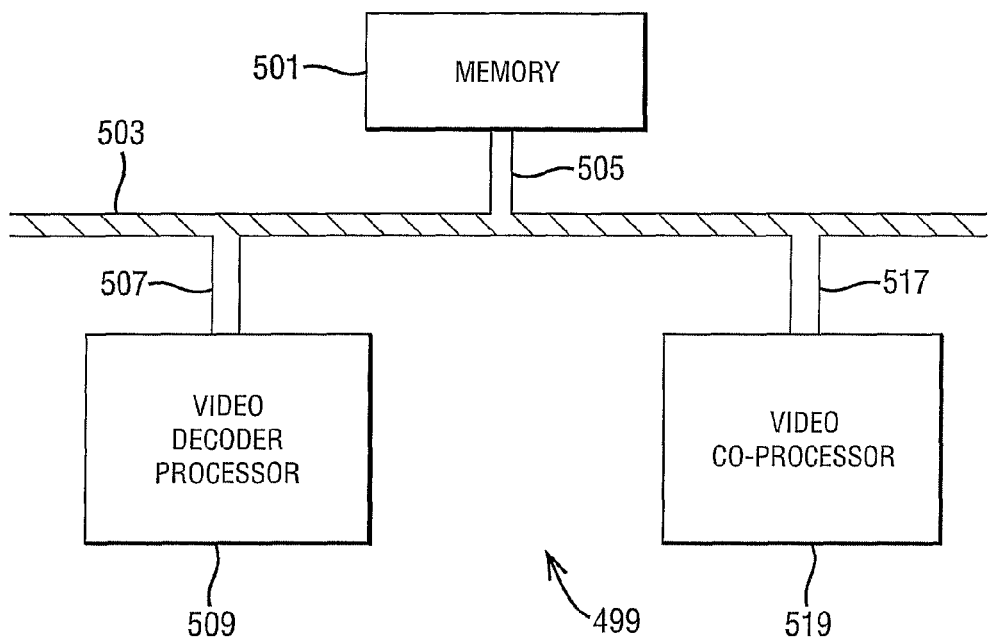
FIG. 4a shows a schematic view of an embodiment of a video decoding system.

With reference to FIG. 4a the first type of the flexible video decoder 499 is shown. The first type represents the insertion of a video co-processor to allow flexibility in the flexible video decoder 499. Communication between the video decoder processor and the video co-processor is via a common data bus.

The flexible video decoder comprises a video decoder processor (VDP) 509, a video coprocessor (VCP) 519, a shared memory 501, a shared data bus 503, and a series of interconnects 505, 507, 517.

The shared data bus 503 interconnects the shared memory 501 via the interconnect 505, the video decoder processor (VDP) 509 via the interconnect 507, and the video co-processor (VCP) 519 via the interconnect 517.

All of the components described are created on a single integrated circuit. In some embodiments of the present invention, however, further components such as external input/output devices and data controllers can be connected to the flexible video decoder, or may be implemented as part of the flexible video decoder.

A flexible video decoder system receives the compressed video data on the shared data bus 503. The data can be received by the flexible video decoder 499 either from an external source via an input/output device not shown or from the shared memory 501.

This data is passed to the video decoder processor (VDP) 509.

Figure 5A:
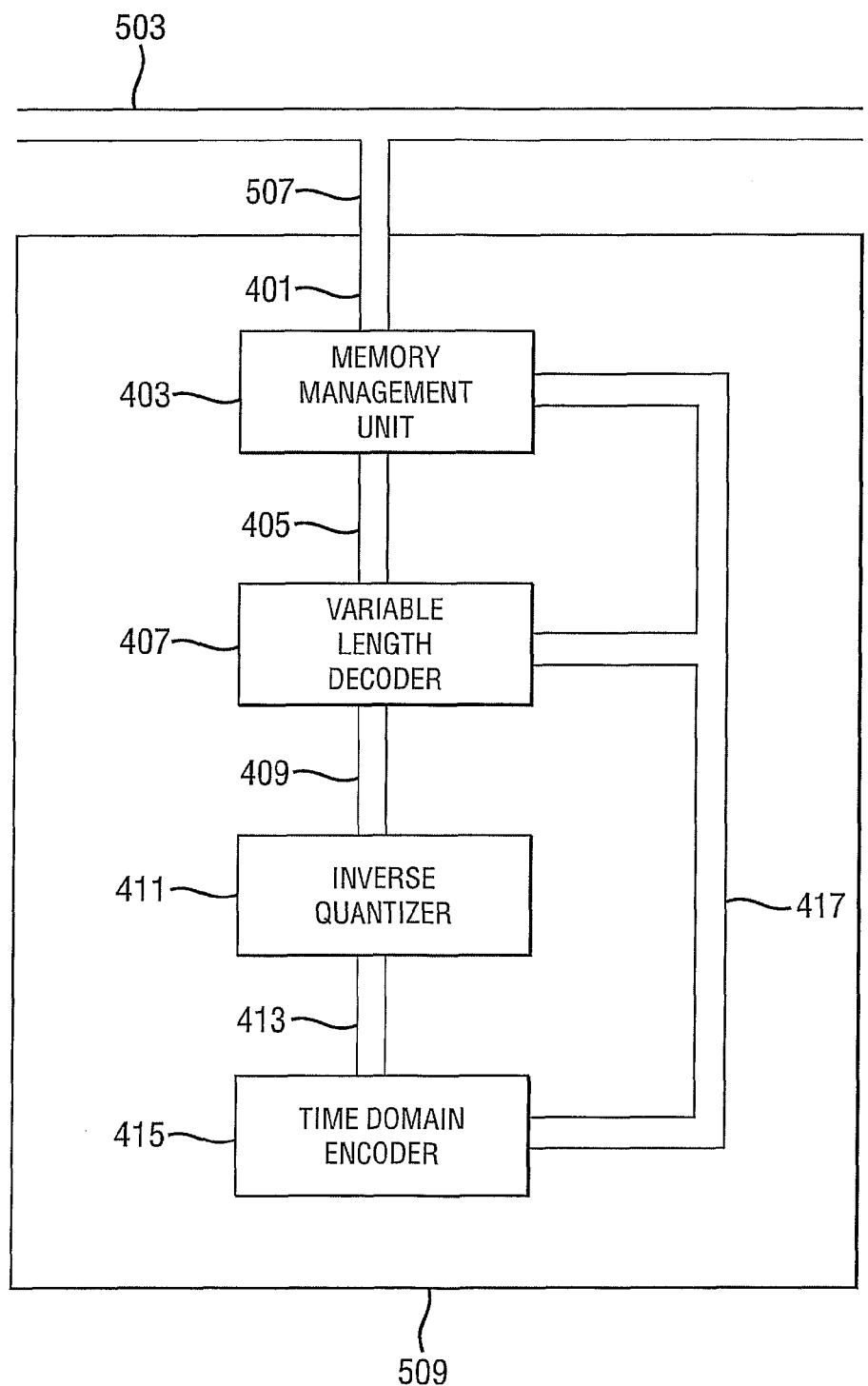
FIG. 5a shows a schematic view of a first arrangement for a decoding video processor as shown in FIGS. 4a and 4b.
Figure 6A:
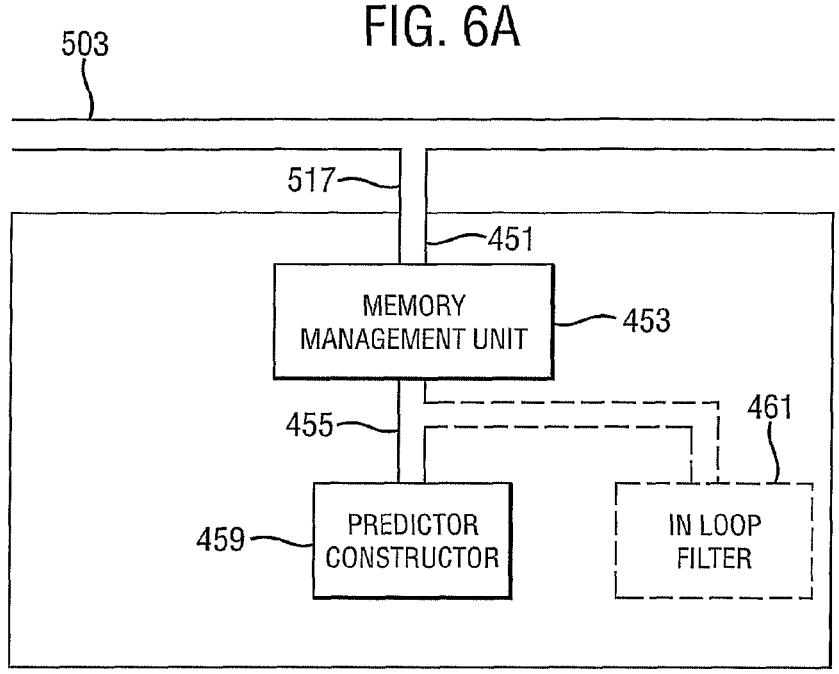
FIG. 6a shows a schematic view of a first arrangement for a video co-processor as shown in FIGS. 4a and 4b.

With reference to FIGS. 5a and 6a a video decoding processor and video co-processor embodying the invention is shown. FIG. 5a shows in further detail a schematic view of the video decoding processor VDP as shown in FIG. 4a. The video decoding processor 509 comprises a memory management unit 403, a variable length decoder 407, an inverse quantizer 411, a spatial domain encoder 415, an internal data interconnect 417, an external data interconnect 401, and interconnects 405, 409, 413.

It is understood that in some embodiments of the present invention the video decoding processor is implemented on a Very Long Instruction Word (VLIW) processor. In such an implementation the data interconnects described are controlled and implemented in software.

The external data bus 401 connects the external interconnect 507 to the memory management unit 403. The memory management unit is further connected via interconnect 405 to the variable length decoder 407. The variable length decoder 407 is connected via interconnect 409 to the inverse quantizer 411. The inverse quantizer 411 is connected via the interconnect 413 to the spatial domain encoder 415. The internal data interconnect 417 connects the outputs of the variable length decoder and the spatial domain encoder to the memory management unit 403.

The memory management unit 403 comprises bus routing and addressing systems, and memory cache in order to buffer data and access the shared data bus 503. Thus data received by the memory management unit 403 is initially buffered prior to being processed.

In embodiments of the present invention whereby the video decoding processor is implemented on a VLIW processor the memory management unit is that belonging to the VLIW processor and contains instruction and data caches.

The memory management unit 403 further is arranged to detect the video data received by the video decoding processor 509 in order to determine the format of the video data and configures the VDP dependent on the format of the video data.

In further embodiments of the present invention whereby the video decoding processor is implemented on a VLIW processor the detection of the received compressed video data is carried out by a software process executing on the VLIW processor. The VLIW processor is then arranged to send commands to the video co-processor to configure the co-processor.

The received data is then transmitted to the variable length decoder 407 for variable length decoding. The variable length decoder 407 is arranged to decode the encoded data stream in a manner as explained previously.

The variable length decoder further is arranged to segment the data dependent on the data type and coding format. If the decoded data is part of an intra picture the data is passed via the interconnect 409 to the inverse quantizer. If the decoded data is a P or B picture the data is segmented into its residual data and motion vector data components. The motion vector data component is output on the internal data interconnect 417, whereas the residual data is passed via the interconnect 409 to the inverse quantizer 411.

The inverse quantizer 411 is arranged to perform an inverse quantization on received data. The inverse quantizer 411 receives the residual data component, or decoded macro-block data and performs an inverse quantization dependent on the format of the encoded data. The data is then passed via the interconnect 413 to the spatial domain encoder 415.

The spatial domain encoder is arranged to carry out a spatial domain encoding, in other words a frequency to spatial domain transform. The spatial domain encoder thus performs a frequency to spatial domain transform dependent on the format of the received data. The processed data is then output onto the internal data interconnect 417.

Hence both the motion vector, and residual data for a P or B picture and the reference data for a I picture is passed via the internal data interconnect 417 to the memory management unit 403, where the data is buffered prior to being transmitted via the interconnect 507 and the shared data bus 503 to the shared memory 501.

If the data is an intra picture, the encoded data is stored in memory as one of the I pictures to be referred to by the other P and B pictures. Similarly if the data is a P picture, the encoded motion vector and residual data is stored in memory as a P picture and can be referred to by other B or P pictures. If however the data is part of a B picture in order to reconstruct the true image the macro-block and residual error need to be created from the motion vector and residual data values.

The video co-processor (VCP) 519 is arranged to receive data and carry out image construction. FIG. 6a shows a schematic view of an embodiment of the video coprocessor 519 as shown in FIG. 4a.

The video coprocessor comprises a memory management unit 453, a predictor constructor 459, an external data interconnect 451 and an internal data interconnect 455.

The external data interconnect 451 connects the interconnect 517 to the memory management unit 453. The memory management unit is connected via the internal data interconnect to the predictor constructor 459.

The memory management unit 453 is arranged to buffer, receive and transmit data via the interconnect 517 to and from the shared memory 501. This information is then placed on the internal data connect 455 for use by the predictor constructor 459.

In one embodiment of the present invention the video coprocessor 519 is implemented on a programmable processor. In such an embodiment the memory management unit is controlled by the programmable processor.

The memory management unit 453 also is arranged to detect the format of the received video data. The memory management unit 453 is also arranged to configure the predictor constructor 459 dependent on the format of the received data.

The predictor constructor 459 is arranged to receive data from the internal data interconnect 455 and process the motion vector data dependent on the format of the data received. The predictor constructor can therefore request reference data and perform interpolation on the received reference data in order to create a required reference macro-block.

The predictor constructor 459 further is arranged to combine the residual and reference data to produce a full predictor macro-block.

Figure 7:
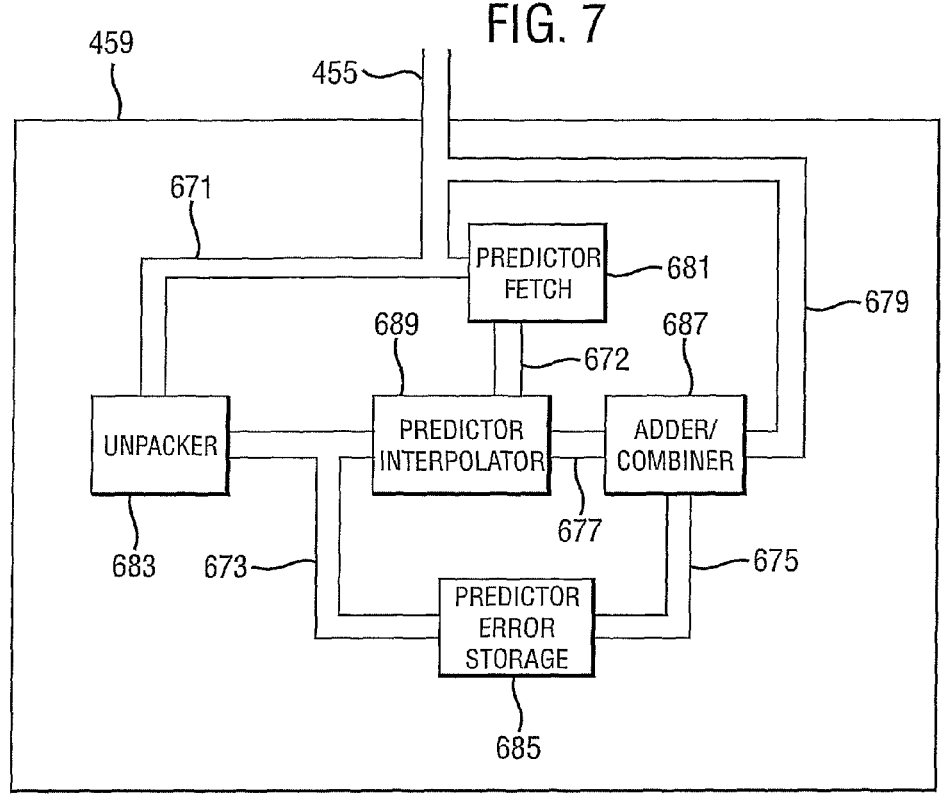
FIG. 7 shows a schematic view of a predictor constructor as shown in FIGS. 6a, 6b and 6c.

With reference to FIG. 7 a schematic view of a predictor constructor is shown. The predictor constructor 459 comprises an unpacker 683, a predictor error storage 685, an adder/combiner 687, a predictor fetch 681, and a predictor interpolator 689. The predictor constructor 459 further comprises an I/O interconnect 671, a predictor interconnect 673, and interconnects 672, 677, 675.

In an embodiment of the present invention whereby the video co-processor 519 is implemented on a programmable processor, the processes described with reference to FIG. 7 may be implemented by a series of software instructions or a combination of a series of software instructions and hardware implementation. In such an implementation involving software processes the term interconnect incorporates the transfer of data between software processes and between registers and/or internal memory.

The I/O interconnect 671 connects the video coprocessor internal data interconnect 455 to the adder/combiner 687, and to the predictor fetch 681, and to the unpacker 683. The predictor interconnect 673 connects the unpacker to the predictor interpolator 689, and to the predictor error storage 685. The interconnect 672 connects the predictor fetch 687 to the predictor interpolator 689. The interconnect 677 connects the predictor interpolator 689 to the adder/combiner 687. The interconnect 675 connects the predictor error storage 685 to the adder/combiner 687.

The unpacker 683 is arranged to receive data from the memory management unit 453 via the internal data connect 455 and to separate the motion vector data from the residual error data. The residual data is passed via the interconnect 673 to the predictor error storage 685, whereas the motion vector predictor data is passed to the predictor interpolator 689 via the interconnect 673.

The predictor interpolator 689 receives the predictor motion vector data and calculates the required reference macro-block data. The predictor interpolator 689 then requests this data via the interconnect 672 from the predictor fetch 681.

The predictor fetch 681 requests the required I or P picture macro-block from the shared memory 501, and retrieves the I or P picture macro-block and passes it to the predictor interpolator 689.

The predictor interpolator is arranged to perform an interpolation based on the configuration information dependent on the format of the video data. The processed video data is than passed via the interconnect 677 to the adder/combiner 687.

Figure 12:
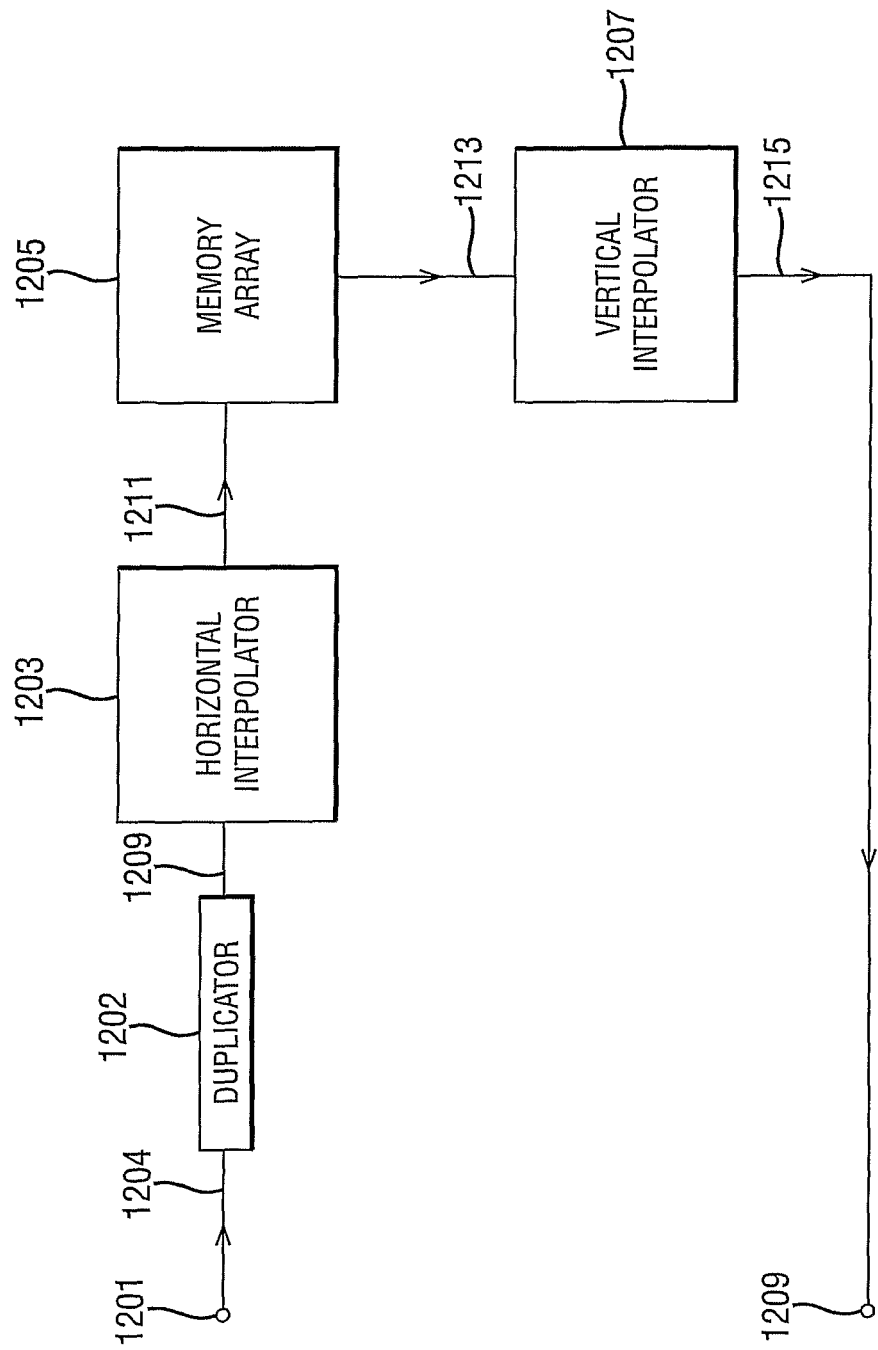
FIG. 12 shows a schematic view of the interpolation engine as used in the predictor interpolator as shown in FIG. 7.

With respect to FIG. 12 a schematic view of an embodiment of the interpolator is shown. The interpolator comprises a duplicator 1202, a horizontal interpolator 1203, a memory array, and a vertical interpolator. The interpolator further comprises an input 1201 and an output 1209, and interconnects 1204, 1209, 1211, 1213, and 1215.

The input 1201 is connected to the duplicator 1202 via the interconnect 1204. The duplicator 1202 is connected to the horizontal interpolator 1203 via the interconnect 1209. The horizontal interpolator 1203 is connected to the memory array 1205 via interconnect 1211. The memory array is connected to the vertical interpolator 1207 via interconnect 1213. The vertical interpolator is connected to the output via the interconnect 1215.

The input receives the pixel data which is required to be interpolated. This pixel information is input into the interpolator horizontal line by horizontal line, with the pixels being input from the leftmost to the rightmost in each line. The pixels are then passed to the duplicator.

The duplicator is used where the reference macro-block being used is only partially available. For instance in some video encoding standards the reference macro-block closest to the current macro-block is not a complete macro-block as stored in the reference image. For example if a feature displayed in a corner of the picture is moved towards the center of the image in a later or earlier picture, the closest reference image is the one containing the partial feature. In such a situation the complete macro-block is required to be reconstructed from the partially retrieved macro-block. This reconstruction is carried out by the duplicator, which repeats the last partial macro-block pixel value according to the video encoding format.

Where the macro-block is completely retrieved from the shared memory, the duplicator passes the pixel data to the horizontal interpolator 1203.

The horizontal interpolator receives the pixel data and performs the horizontal interpolation dependent on the degree of interpolation and the format of the video stream. For example where a half pixel interpolation is required, this can be carried out using a sample delay and an adder. Pixel data is passed both to the sample delay and to one of the inputs of the adder. The second input of the adder is connected to the output of the sample delay. The output of the adder is therefore the sum of the current and previous pixel. A division by two can then be carried out to produce an average value—or the interpolated value between the two pixels. The horizontally interpolated data is then passed into a memory array so that the pixels form an array of lines of interpolated values.

Once the memory array is full, in other words all of the pixels have been horizontally interpolated the memory array is read vertically to the vertical interpolator 1207.

The vertical interpolator is capable of carrying out interpolation in the vertical plane. The vertical interpolation can for example be a simple half pixel interpolation and comprise a similar apparatus as the horizontal interpolator—an adder, divider and a sample delay element to create and average value.

The output of the vertical interpolator is then passed to the output 1209, which in embodiments of the present invention is output to the adder/combiner 687.

In further embodiments of the present invention, the horizontal and vertical interpolators can be bypassed if there is no interpolation required in either the horizontal or vertical degree. Further embodiments of the interpolator may only have one division stage after the final interpolation stage. Further embodiments of the present invention can initially read pixel information in a vertical direction and perform vertical interpolation on the pixel data prior to performing horizontal interpolation. Further embodiments of the present invention may only use one interpolation stage. In such an implementation the data is read into the interpolation stage in a first order in order to carry out the required horizontal or vertical interpolation. The interpolation stage outputs the data to the memory array. The data is then read out of the memory array and back into the same interpolation stage in a second different order to implement the other required interpolation.

The predictor error storage 685 is arranged to store the residual data otherwise known as predictor error data whilst the predictor interpolator performs interpolation on the motion vector data. The predictor error storage transmits the predictor error data to the interconnect 675.

The adder/combiner 687 receives inputs from the interconnects 677 and 675 comprising the interpolated predictor macro-blocks, and predictor error data respectively and combines these to produce completed video image data. The image data is output via the data interconnect 679 to the internal data interconnect. The data is passed to the memory management unit 453 to be passed to the shared memory.

In a further embodiment of the present invention the video co-processor 519 further comprises an in-loop filter 461. The in-loop filter is connected via the internal data interconnect 465 to the memory management unit 453 and predictor constructor 459.

The in-loop filter 461 is arranged to perform in-loop filtering, such as de-blocking filtering as explained earlier on the received video data.

The in-loop filter 461 is configured dependent on the video data format. The in-loop filter receives image data either from the memory management unit 453, or the predictor constructor 459. The in-loop filter is capable of processing both reference and non-reference image data. Where the video data format does not explicitly allow the use of in-loop filtering the image data sent to the in-loop filtering is stored both pre and post filtering so that pre-filtered data is used for future referencing but the post filtering data is used for the improved display image.

With reference to FIGS. 5b and 6a a schematic view of a second embodiment of the present invention is shown.

The video decoding processor 509 comprises a memory management unit 403, a variable length decoder 407, an inverse quantizer or 411, a spatial domain encoder 415, a data packer 419, an internal data interconnect 417, an external data interconnect 401, and interconnects 405, 409, 413.

The memory management unit 403, the variable length decoder 407, inverse quantizer 411 and spatial domain encoder 415 are connected and operate as described in relation to FIG. 5a. The internal data interconnect 417 further connects the data packer 419 to the memory management unit 403, the variable length decoder 407 and the spatial domain encoder 415.

The data packer 419 receives the data output by the variable length decoder 407 and spatial domain decoder 415 and processes the data so to produce a standardized video data packet. The purpose of such a packing process is to reduce the memory bandwidth required in transferring data from the video decoding processor. As is discussed in detail later the residual picture data, otherwise known as prediction error data is 9 bits long. It is therefore possible to pack 7 residual picture data elements into a single 64 bit word. Furthermore in embodiments of the present invention where the video decoding processor 509 is implemented in a VLIW processor the data packer can be implemented by a software process.

Figure 9:
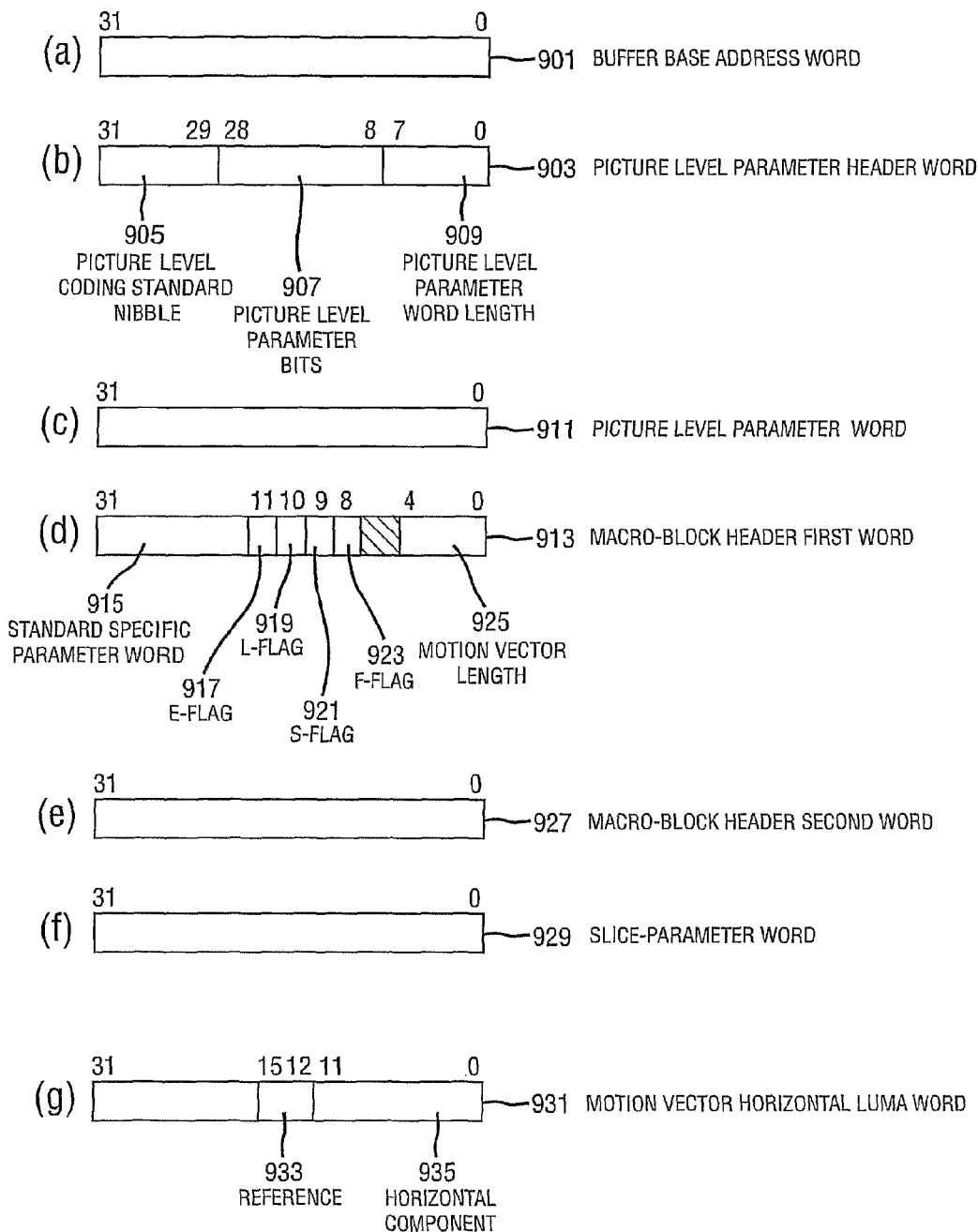
FIG. 9 shows decoded data words passed to the packer unit as shown in FIG. 8.

In order to understand the role of the data packer the data words produced by the VDP 509 and received by the data packer 419 will be described. These are shown in FIG. 9.

The first word produced by the VDP for each image is the buffer base address (BBA) word 901 as shown in FIG. 9a. The buffer base address word defines the base memory location within which to place the following image data. Embodiments of the present invention can use the full 32 bit word (which provides a maximum of $2^{32}$ (4,294,967,296) addressable locations) or use a smaller number of addressable locations addressable using fewer bits.

Following the buffer base address word 901 the VDP 503 produces a picture level parameter header word (PLPH) 903. The picture level parameter header 903 further comprises a coding standard nibble 905, picture level parameter bits 907, and a parameter word length byte 909.

The coding standard nibble 905 indicates the current video standard being decoded. In one embodiment of the present invention the nibble $0000_b$ (where the symbol b indicates that the number referred to is a binary number) indicates a MPEG2 stream, whereas a nibble $0001_b$ indicates a MPEG4 stream (a standard proposed by the Motion Picture Experts Group and hereby incorporated by reference, also including the DivX video encoding method. The nibble $0010_b$ indicates a RealVideo9 signal, a proprietary encoding system proposed by Real Networks. The nibble $0011_b$ indicates a H.263 stream (H.263 is a International Telecommunication Union-Telecommunications ITU-T standard recommendation, which is hereby incorporated by reference) for video coding over low bit rate communication. The nibble $0100_b$ would indicate that the video stream was a Microsoft WindowsMedia Video 9 video stream, a proprietary standard created by Microsoft which is hereby incorporated by reference. A nibble of $1000_b$ would indicate that the video stream was a H.264 standard stream (H.264 is a further video coding over communication systems recommendation by the ITU-T board which is hereby incorporated by reference).

The coding standard information is needed since the different MPEG type encoding systems have variations in the type of data contained in the macro-block data. Thus for this reason the DivX and MPEG4 types can be grouped together as the syntax of the macro-blocks for these two standards are the same.

The picture level parameter bits 907 pre-indicate the presence of certain types of data in the picture level parameter words 911.

The picture level parameter word length byte 909 defines the number of parameter words which follow the picture level parameter header word 903. The maximum value that the picture level parameter word length can have is $2^8-1$ (255).

Thus following the picture level parameter header word 903 is a number of picture level parameter words, one of which is shown by example in FIG. 9(c) 911. The picture level parameters define the variables pre-indicated by the picture level parameter bits 907. These variables define such items as picture type, picture size, interpolation modes, filtering type and filter variables.

Once the picture level parameters are set for a specific image the following data words passed by the VDU 509 to the data packer 419 define the many macro-blocks which go to make up the image. In an embodiment of the present invention the data is passed a macro-block at a time, and in the order described below.

The first word defining each macro-block is the macro-block header first word 913. With reference to FIG. 9(d) the macro-block header first word is further detailed.

The macro-block header first word 913 further comprises a standard specific parameter word 915, an E (End) flag 917, a L (new sLice) flag 919, a S (Skipped macro-block) flag 921, an I (Intra macro-block) flag 923, and a motion vector length word 925.

The standard specific parameter word 915, together with the whole of the macro-block header second word 927 (the macro-block second header word following directly after the macro-block first header word and as shown with reference to FIG. 9(e)) comprise information relating to the standard specific macro-block prediction mode.

In other words both the standard specific parameter word 915 and the macro-block header second word 927 comprise such parameters as the type of macro-block being decoded, the number and direction of the reference images to use in order to reconstruct the current frame/field.

For example the table below shows the various predictor code values representing the various macro-block types in a MPEG2 encoded stream. These values may differ in meaning for different encoding methods.

| Macro-block Type | Predictor code value |
| --- | --- |
| 0 | 1 - Intra |
| 1 | 2 - Predicted forward |
| 2 | 3 - Predicted backward |
| 3 | 4 - Predicted interlaced forward |
| 4 | 5 - Predicted interlaced backward |
| 5 | 6 - Predicted bi-directional |
| 6 | 7 - Predicted interlaced bi-directional |

Thus for the first type of macro-block the macro-block being processed is a intra block. The second and third types of macro-block define frame based pictures which are referenced to frames stored either prior or after the currently processed frame. The fourth and fifth types of macro-block define field based pictures which are referenced to fields stored either prior or after the currently based fields. The sixth type of macro-block defines a frame based picture that is referenced to frames both prior and after the currently processed frame. Finally the seventh image defines a field based picture that is referenced to fields both prior and after the currently processed fields.

The four flag bits, I flag 923, S flag 921, L flag 919, and E flag 917 are inserted into the macro-block header word in order to enable the packer to perform the packing process more efficiently.

The I flag 923 indicates whether the current macro-block is part of an intra macro-block.

The S flag 921 indicates whether or not this macro-block was skipped during coding.

The S flag 921 is only asserted when the I flag 923 is not asserted, in other words the two flags are mutually exclusive as an intra macro-block can not be skipped.

The L flag 919 indicates whether this is a first macro-block of a slice.

The E flag 917 indicates whether this macro-block is the last macro-block for the current picture.

The motion vector length word 925 defines the number of motion vectors within the current macro block. The number of motion vectors required to produce a finished macro-block is equal to (the value of the motion vector length word)+1. Thus a motion vector length word of $00000_b$ would indicate that there was 1 motion vector to process, and a motion vector length word of $11111_b$ would indicate that there were 32 motion vector to process.

The situation of there being 0 motion vectors in the macro-block is provided for by the assertion of the I flag 923 indicating that the current macro-block is intra-coded and therefore without motion vectors.

The number of motion vector words in P or B picture macro-blocks is dependent on the type of encoding used.

For example using MPEG2 encoding as an example the following table shows the number of motion of vectors required.

| MB Type | Type Discription | No of Motion Vectors (No of MV words) |
| --- | --- | --- |
| 0 | Intra | 0 |
| 1 | Predicted for | 1 (4) |
| 2 | Predicted back | 1 (4) |
| 3 | Predicted interlaced for | 2 (8) |
| 4 | Predicted interlaced back | 2 (8) |
| 5 | Predicted bi-dir | 2 (8) |
| 6 | Predicted interlaced bi-dir | 4 (16) |

If the L flag 919 is asserted the words sent following the macro-block header words 913 and 927 are the slice parameter words, one of which is displayed with reference to FIG. 9(f) 929. If the L macro-block flag 1027 is not asserted no slice parameter words are sent and the packer instead outputs the next type of data word.

Thus in other words if the video stream is not a H.264 encoded stream and the macro-block being decoded is not the first macro-block of the stream there are no slice parameter words 929.

The slice parameter words define variables used in the processing of H.264 encoded streams.

If the current macro-block is a intra macro-block, as indicated by the I flag 923 in the macro-block header first word 913 being asserted no motion vector information is required to reconstruct the macro-block and the packer passes to the next series of words to transmit in the sequence. If the current macro-block is not a intra macro-block the VDP 509 passes to the data packer 513 a series of words defining the motion vector information. As discussed previously the composition and the number of motion vector words per macro-block is dependent on the type and variant of the coding scheme used.

In order to locate a macro-block on a horizontal and vertical axis, each motion vector describes a horizontal and vertical component. Furthermore in all of the coding methods the luma and chroma motion vectors are sent separately. Thus the smallest number of motion vector words per motion vector and therefore per macro-block (for a non-reference frame/field) is 4—horizontal luma, vertical luma, horizontal chroma, vertical chroma.

A quartet of motion vector words representing a single motion vector as used in a embodiment of the present invention is shown in FIGS. 9(g)-(j). These four motion vector words represent the basic four motion vector words used in, for example, a MPEG2 encoded data stream where a predicted forward or predicted back type macro-block is being decoded.

In the current example the order that the VDP passes motion vector words is in the order horizontal luma word, vertical luma word, horizontal chroma word, vertical chroma word. In other embodiments other combinations are possible and are discussed below.

With reference to FIG. 9(g) the motion vector horizontal luma word 931 is shown. The motion vector horizontal luma word 931 comprises a reference picture index value 933 and a horizontal luma component 935.

The reference picture index value 933 is a 4 bit number which indicates which of the maximum of 16 stored pictures form the basis image.

The horizontal luma component 935 is a 12 bit number which is capable of representing a offset in the range of −1024 to 1023.5 in half pixel precision or −512 to 511.75 where the precision is one quarter pixel. The horizontal luma component therefore describes an horizontal offset of somewhere between these numbers from the current macro-block and the intra or P macro-block.

With reference to FIG. 9(h) the motion vector vertical luma word 937 is shown. The motion vector vertical luma word 937 comprises a field indicator bit 939 and a vertical luma component 941.

The field indicator bit 939 indicates whether the current macro-block is the upper or lower field of the pair of fields. Where the current macro-block is frame based, the field indicator is undefined and may be a 0 or 1. Where the current macro-block is field based, a motion vector defining an upper field macro-block has a first value and the motion vector defining a lower field has the second and opposite value.

The vertical luma component 941 is a 12 bit number which is capable of representing an offset in the range of −1024 to 1023.5 in half pixel precision or −512 to 511.75 where the precision is one quarter pixel. The vertical luma component therefore describes a vertical offset of somewhere between these numbers from the current macro-block and the intra or P macro-block.

With reference to FIG. 9(i) the motion vector horizontal chroma word 943 is shown. The motion vector horizontal chroma word 943 comprises a horizontal chroma component 945.

The horizontal chroma component 945 is a 12 bit number which is capable of representing an offset in the range of −1024 to 1023.5 in half pixel precision or −512 to 511.75 where the precision is one quarter pixel. The horizontal chroma component therefore describes a horizontal chroma offset of somewhere between these numbers from the current macro-block and the intra or P macro-block.

With reference to FIG. 9(j) the motion vector vertical chroma word 947 is shown. The motion vector vertical chroma word 947 comprises a vertical chroma component 947.

The vertical chroma component 947 is a 12 bit number which is capable of representing an offset in the range of −1024 to 1023.5 in half pixel precision or −512 to 511.75 where the precision is one quarter pixel. The vertical chroma component therefore describes a vertical chroma offset of somewhere between these numbers from the current macro-block and the intra or P macro-block.

In further embodiments of the present invention the reference value and field indicator may be stored more than once per quartet of motion vector words.

As previously described more than one quartet of vector words may be required per macro-block in order to define the estimated macro-block location for more than a single picture as in bidirectional encoding, and also for more than a single frame/field as in interlaced image encoding.

As also previously mentioned and determined by the macro-block header first word 913 and the motion vector length 925 up to 32 motion vectors may be defined in a single macro-block. Thus for example in H.264 32 motion vectors may be required and therefore 128 motion vector words required for a single macro-block.

Where there is more than one motion vector to be defined per macro block, embodiments of the present invention are arranged such that the VDP 509 outputs all of the luma motion vector words before outputting all of the chroma motion vector words. Other embodiments of the present invention are arranged such that the VDP 509 outputs each motion vector quartet individually one at a time.

If the macro-block being decoded by the VDP is an intra macro-block the next type of data word to be output by the VDP are pixel data reference words. With reference to FIG. 9(k) a pixel data reference word 951 is described in more detail. The pixel data reference word 951 comprises a pixel reference byte 953. The pixel reference byte is the intra macro-block decoded pixel data as an 8 bit value. Thus the pixel has a value in the range from 0 to 255.

If the macro-block being decoded by the VDP is part of a predicted macro-block the next type of data word to be output by the VDP are pixel data residual words. With reference to FIG. 9(l) a pixel data residual word 955 is described in more detail. The pixel data residual word 955 comprises a pixel residual value 957. The pixel residual value is the pixel residual value with reference to a known reference value. The 9 bit value gives a relative shift of the range from −256 to 255.

Providing the current macro-block is not skipped, as indicated by the S flag 921 in the macro-block header first word 913, the VDP 509 outputs 384 words of either pixel data residual words 955 or pixel data reference words 951. This defines six 8 by 8 blocks—4 blocks defining luma values and 2 blocks defining chroma values. The pixel word order for each of these blocks is row by row, in other words a complete first row is output from left to right before starting again on a second row from left to right.

In frame images in all standards except H.264 and in frame macro-blocks encoded in H.264 adaptive field/frame pictures, the row order is always sent using an interlaced pattern—in other words first the odd rows of pixel data are sent by the VDP and then the even rows of pixel data is sent. This ordering is carried out by the VDP prior to sending it to the data packer.

In MPEG2 or H.264 field pictures and H.264 field macro-blocks in adaptive field/frame pictures each block contains data from one field only.

With reference to FIG. 6a as implemented in the second embodiment the video coprocessor 519 comprises the same as the video coprocessor 519 implemented in the first embodiment of the present invention. The second embodiment predictor constructor 459 as shown in FIG. 7 is the same as that implemented in the first embodiment excepting that the unpacker 683 of the predictor constructor 459 is arranged to unpack the video data packets prior to segmenting the data into residual and motion vector components.

The second embodiment predictor interpolator can further comprise an interpolation engine as described previously and shown in FIG. 12.

The first type of implementation is therefore shown by FIG. 4a and detailed in the first two embodiments, the first shown by a combination of FIGS. 5a and 6a and the second shown by the combination of FIGS. 5b and 6a, which are further detailed by the FIGS. 7 to 12. This first type represents a more flexible and cost effective solution than either the GPU or current video decoding systems.

However, the reliance on passing all of the information from the VDP to the memory and then from the memory to the VCP can cause the VDP problems in some embodiments of the invention with respect to efficient memory bandwidth utilization. Although the addition of a data packer as detailed in the second embodiment may increase the efficient use of memory bandwidth to and from the VDP it may do so at the cost of inefficient use of the VDP in terms of processing video and possibly audio data.

Figure 4B:
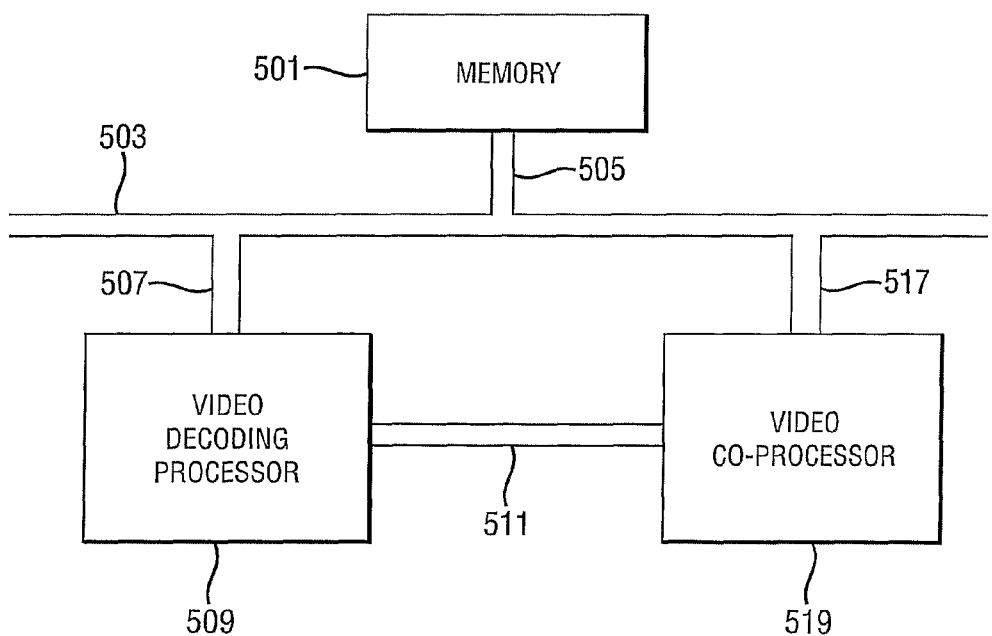
FIG. 4b shows a schematic view of further embodiments of a video decoding system.

Therefore with reference to FIG. 4b a schematic view of a second type of flexible video decoder is shown. This embodiment attempts to improve on some of the problems of the previous embodiment.

Where elements perform substantially the same tasks in the second type and its embodiments as the first type and its embodiments as shown in FIG. 4a the reference figures are the same.

The flexible video decoder 509 comprises a video decoder processor (VDP) 509, a video coprocessor (VCP) 519, a shared memory 501, a shared data bus 503, and a series of interconnects 505, 507, 517. The flexible video decoder further comprises a data interconnect 511.

The shared data bus 503 interconnects the shared memory 501 via the interconnect 505, the video decoder processor (VDP) 509 via the interconnect 507, and the video co-processor (VCP) 519 via the interconnect 517. The data interconnect 511 connects the video decoding processor 509 to the video co-processor 519.

Thus in this embodiment of the present invention there is a direct connection between the video decoding processor 509 and video coprocessor 519.

This direct connection can be exploited by the use of a 'synchronized' data connection or an 'asynchronized' data connection.

FIG. 13 shows a schematic view of the differences between 'synchronized' and 'asynchronized' data connections. The 'synchronized' data connection as shown in FIG. 13a is one in which data processed by the video decoding processor is passed to the video coprocessor and is processed as soon as it is received. This can be seen in that the pictures n, n+1 and n+2 are received at the VDP at times $t_1$, $t_2$, and $t_3$. Each picture is decoded 1351, 1355, 1359, and the decoded information passed to the VCP and the picture reconstructed as soon as possible. As the reconstruction of each picture takes more time than the decoding stage the VCP soon starts to hold up the processing in the VDP, shown as the stall time in the VDP 1367 which also causes the VCP to over-run in the reconstruction of each picture as shown by the areas 1363 and 1365. Thus in other words the VDP and VCP have to be synchronized in order that data passes smoothly through the VDP and VCP pair so that a new picture can be displayed within the picture refresh period.

In the 'asynchronous' data connection as shown in FIG. 13b, although the data is passed via the direct data connection, the video coprocessor is only required to receive and store the data in the video decoding processor timeframe and can therefore process the data over a more flexible time period. As is shown in FIG. 13b, although there is an effective delay of one time period from the receiving the encoded data at the VDP and decoding the picture 1301, 1307, and 1315, and reconstructing the picture at the VCP, 1303, 1309 and 1313 there are no stalling of the VDP as it waits for the VCP to clear its previous picture reconstruction. Furthermore as the VDP is not kept in a stalled condition it is capable of performing other tasks during the time periods where it is not decoding the received pictures, as shown by the periods 1305 and 1311. These tasks include audio decoding or other data related imaging such as subtitle display.

Figure 6B:
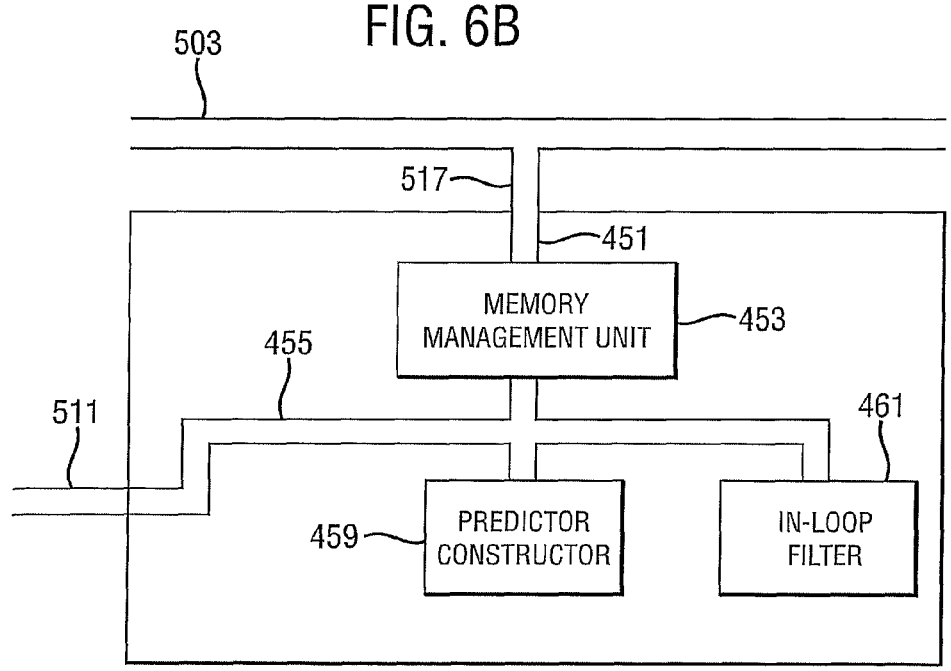
FIG. 6b shows a schematic view of a second arrangement for a video co-processor as shown in FIGS. 4a and 4b.

With reference to FIG. 5c and FIG. 6b schematic views of a third embodiment of the present invention are described which may exploit a 'synchronous' data connection.

The VDP 509 as shown in FIG. 5c, comprises a memory management unit 403, a variable length decoder 407, an inverse quantizer 411, a spatial domain encoder 415, an internal data interconnect 417, an external data interconnect 401, and interconnects 405, 409, 413.

The external data bus 401 connects the external interconnect 507 to the memory management unit 403. The memory management unit is further connected via interconnect 405 to the variable length decoder 407. The variable length decoder 407 is connected via interconnect 409 to the inverse quantizer 411. The inverse quantizer 411 is connected via the interconnect 413 to the spatial domain encoder 415.

The internal data interconnect 417 in the third embodiment differs from the internal data interconnects as described in the previous embodiments as the outputs of the variable length decoder and the spatial domain encoder are not connected to the memory management unit 403, but connects the outputs of the variable length decoder and the spatial domain encoder to the interconnect 511.

Therefore the VDP functions in a similar manner to that described in the first two embodiments except the output from the variable length decoder 407 and spatial domain encoder 415 are not passed back to the memory management unit 403 but are passed via the interconnect 511 to the video co-processor 519.

The schematic view of the third embodiment VCP 519 is shown in FIG. 6b. The third embodiment VCP 519 comprises a memory management unit 453, a predictor constructor 459, an external data interconnect 451, the in-loop filter 619 and an internal data interconnect 455. It can be appreciated that further embodiments of the VCP 519 may not require an in-loop filter 619.

The external data interconnect 451 connects the interconnect 517 to the memory management unit 453. The memory management unit is connected via the internal data interconnect to the predictor constructor 459 and the in-loop filter 619. The third embodiment as shown in FIG. 6b differs from the first and second embodiment VCP as the internal data interconnect 455 is connected to the data interconnect 511, thus connecting the VDP 509 to the components of the VCP 519.

Aside from the manner in which the VCP as shown in FIG. 6b receives the data from the VDP as shown in FIG. 5c, the functionality of the VCP is substantially similar to that detailed in the VCP described in the first embodiment. Therefore the predictor constructor as described previously and as shown in FIG. 7 and the interpolation engine as shown in FIG. 12 are both applicable to the third embodiment.

In such a 'synchronous' data connection the VDP 509 and VCP 519 are connected together in a system known as a master-slave connection. Thus data passed from the VDP 509 is received by the VCP 519 and processed as soon as it was received.

A fourth embodiment of the present invention is shown by the combination of the VDP as shown in FIG. 5d and the VCP as shown in FIG. 6b as incorporated into the implementation as shown in FIG. 4b.

In this fourth embodiment the VDP processes the data passed from the variable length decoder 409 and spatial domain encoder 415 into data packet format in a similar manner to that detailed earlier in the second embodiment of the invention. A schematic view of such an embodiment of a VDP 509 is shown in FIG. 5*d*. The VDP implemented in the fourth embodiment of the invention differs from the VDP implemented in the third embodiment as a data packer 419, similar to that described earlier in the second embodiment is inserted between the internal data interconnect 417 and the data interconnect 511. Similarly the VCP predictor constructor 459 comprises an unpacker 683. The VCP as shown in FIG. 6*b* therefore receives the packets as processed by the data packer and unpacks the processed data in a manner similar to that described earlier in the second embodiment. The fourth embodiment therefore has the advantage of a direct link between the VDP and VCP and also has efficiently packed data using the link.

The 'synchronous' data connection embodiments, the third and fourth embodiments, retain the flexibility of decoding various types of video data but without the inefficiencies created by using the memory management unit 403 of the VDP 509 to both receive the raw encoded data and also transmit the partially processed video data. The 'synchronous' data connection embodiments though by directly linking the VDP 509 and VCP 519 may require a relatively strict timing synchronisation. In order that both the VDP and VCP process data efficiently both the VDP and VCP decode each picture at the same rate. If this synchronisation is not maintained either the VDP waits for the VCP to finish processing and catch up with the VDP, or the VCP waits for the VDP to finish processing a macro-block or data packet. Internal buffering of the data can prevent some of the delays.

If the VDP is required to do more than video decoding of the received data stream then the 'synchronous' data connection means that the VCP is not being efficiently used. The VCP during these times is left idle.

The 'asynchronous' data connection embodiments as shown by the fifth and sixth embodiments of the present invention are aimed to reduce to any potential inefficiencies and strict data synchronisation required by the 'synchronous' data connection, but without imposing further demands on the VDP 509.

The fifth embodiment of the present invention is described with reference to FIGS. 4*b*, 5*c* and 6*c*, which show schematic views of a VDP 509 and VCP 519 which may exploit an 'asynchronous' data connection such as shown in the second type.

The VDP as implemented in the fifth embodiment is similar to that implemented in the third embodiment of the present invention, wherein data is passed from the outputs of the variable length decoder 407 and spatial domain encoder 415 to the interconnect 511. The data passed is unpacked and is transmitted via the interconnect to the VCP.

Figure 6C:
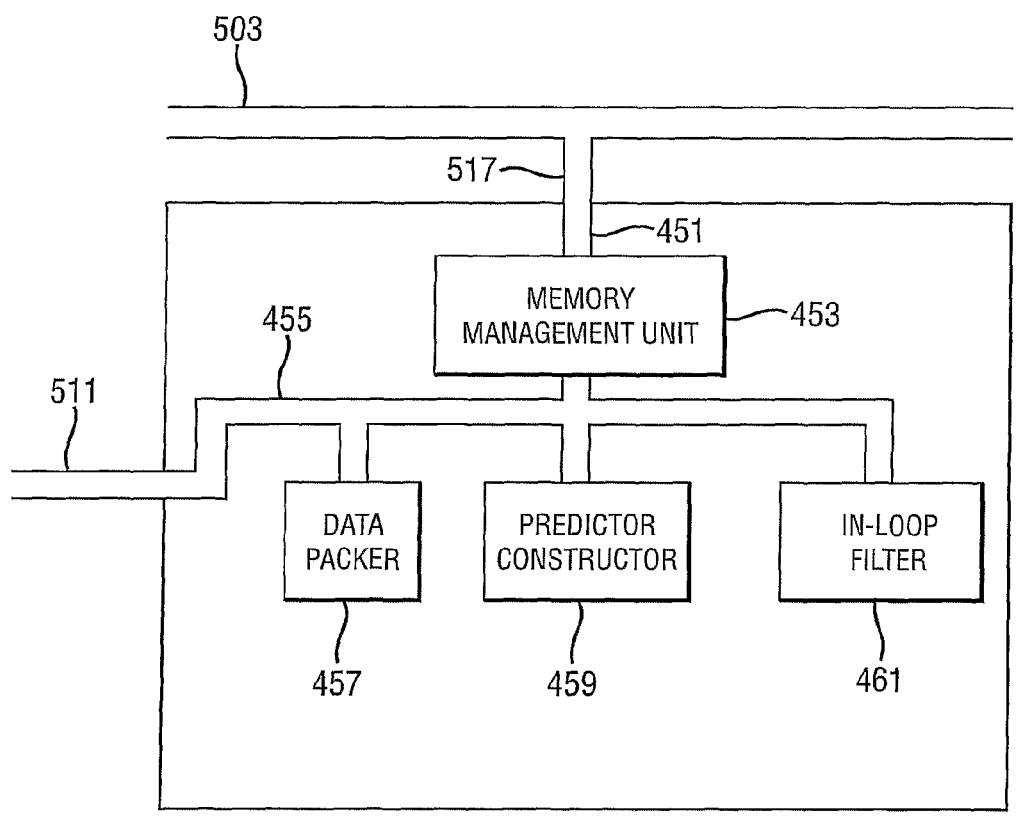
FIG. 6c shows a schematic view of a third arrangement for a video co-processor as shown in FIGS. 4a and 4b.

The VCP 519 as shown in the schematic view in FIG. 6*c* comprises a memory management unit 453, a predictor constructor 459, an external data interconnect 451, the in-loop filter 619 and an internal data interconnect 455. It can be appreciated that further embodiments of the VCP 519 may not require an in-loop filter 619. The VCP 519 as shown in the fifth embodiment of the invention differs from those described in all previous embodiment VCP implementations in that the VCP further comprises a data packer unit 457.

The external data interconnect 451 connects the interconnect 517 to the memory management unit 453. The memory management unit is connected via the internal data interconnect to the predictor constructor 459, the in-loop filter 619, and the data interconnect 511. The embodiment as shown in FIG. 6*c* further has the internal data interconnect 455 being connected to the data packer unit 457.

Figure 8:
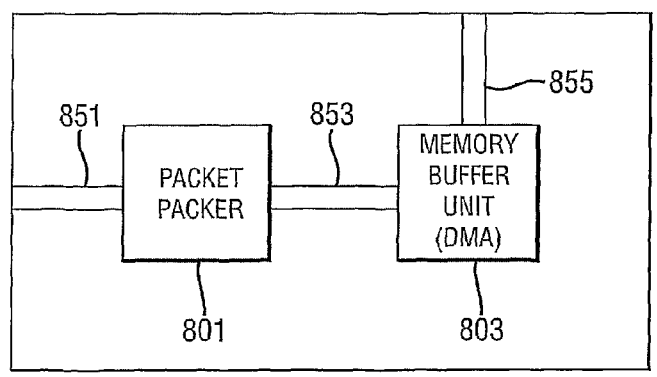
FIG. 8 shows a schematic view of a data packer as shown in FIGS. 5b, 5d and 6c.

With reference to FIG. 8 a schematic view of a data packer 457 and application of a data packer will be described in further detail. The data packer comprises a packet packer 801, a memory buffer unit 803, and interconnects 851, 853 and 855.

The first interconnect 851 connects the data interconnect 511 to the input of the packet packer 801. The second interconnect 853 connects the output of the packet packer 801 to the input of the memory buffer unit 803. The third interconnect 855 connects the output of the memory buffer unit 803 to the data interconnect 515.

As it can be appreciated the functionality of the packet packer 801 and memory buffer unit can be combined into a single unit.

Data words as detailed above are received by the data packer 457. These words are transferred to the packet packer 801 via the interconnect 851.

The packet packer 801 examines each of the words and controls the memory buffer unit 803 dependent on the examined word. The packet packer 801 and the memory buffer unit work together to convert the words created by elements of the VDP 509 into a series of self contained packets of data each packet containing the data required to restore a single picture (either a frame or a field).

With reference to FIG. 10 the process through which the data packer processes the word created by the elements of the VDP 509 are further detailed. Odd numbered steps on the left side are those carried out by the packet packer 801, even numbered steps on the right hand side are those carried out by the memory buffer unit 803.

For each separate image an image loop is initiated. The first step 1001 carried out by packet packer (PP) 801 is to read the buffer base address word 901. This is passed to the memory buffer unit (MBU) 803 and stored in the MBU in step 1002 for later use.

The next step 1003 is for the packet packer 801 to read in the picture level parameter header word 911. This is used to set a remaining picture level parameter counter in the packet packer 801 to read the following words as picture level parameter words. The picture level parameter word is also used to set up the MBU in terms of memory allocation for the picture level parameter words and to any picture level coding standard variations in the macro-blocks. The picture level parameter header word is also passed to the MBU and stored in step 1004.

The next step 1005 is to read in the following words until the remaining picture level parameter word counter reaches zero. These words are passed to the MBU 803 and stored in step 1006.

The next step 1007 forms the start of a macro-block loop. The macro-block loop is repeated for each macro-block until the last macro-block for that image is received. The macro-block header words 913, 927 are initially read. The packet packer 801 copies the flag settings 917, 919, 921, 923, standard specific parameter word 915 and motion vector length 925 and dependent on these values allocates memory in the MBU 803 for the macro-block. Furthermore the macro-block header words are passed to the MBU and stored in the MBU in step 1008.

The next step 1009 determines if the L (slice) flag 919 has been asserted and if the L flag is asserted the packet packer 801 reads in the slice parameter words. These words are then passed to the MBU 803 and stored in the MBU in step 1010.

The next step 1011 determines if the I (Intra) flag 923 has not been asserted, and if the I flag 923 is not asserted the packet packer 801 reads the motion vector words 931, 937, 943, 947. The number of motion vector words to be read is determined by the value of the standard specific parameter word 915 and motion vector length value 925 gathered from the macro-block header words 913, 927 and as discussed earlier. The motion vector words are passed to the MBU and stored in the MBU in step 1212. This step therefore occurs where the macro-block being decoded is part of a predicted macro-block.

The next step 1013 determines if both the I flag 923 and the S (Skipped) flag 921 have not been asserted. If both I and S flag are not asserted the packet packer 801 reads the pixel data residual words 955. The number of words per macro-block is known in the art and discussed earlier. The pixel data residual words 955 are passed to the MBU and stored in the MBU in step 1214. This step therefore occurs where the macro-block being decoded is both part of a predicted macro-block and also a non-skipped macro-block.

The next step 1015 examines if the I flag is asserted. If the I flag is asserted, in other words the macro-block is part of an intra macro-block, then the packet packer 801 reads pixel data reference words 951. The number of words per macro-block is also known in the art and discussed earlier. The pixel data reference words 951 are passed to the MBU and stored in the MBU in step 1216.

The next step 1017 examines if the E (End) flag is asserted. If the E flag is not asserted then the packet packer ends this instance of the macro-block loop and returns the process to step 1007 and the start of the next macro-block loop, awaiting data from the next macro-block.

If the E flag is asserted then step 1019 is carried out. Step 1019 ends this instance of the image loop and returns the process to step 1001 and the start of the next picture packet. At the same time the packet packer 801 instructs the MBU to carry out step 1020. This step causes the MBU to issue a memory interrupt request. Once the request has been granted the memory buffer unit passes the stored packet to the memory management unit 403 and awaiting the transfer to shared memory 501 storing the packet in the location provided by the buffer base memory address 901. Finally the MBU restores itself to an initial condition awaiting data from the next image.

Figure 11:
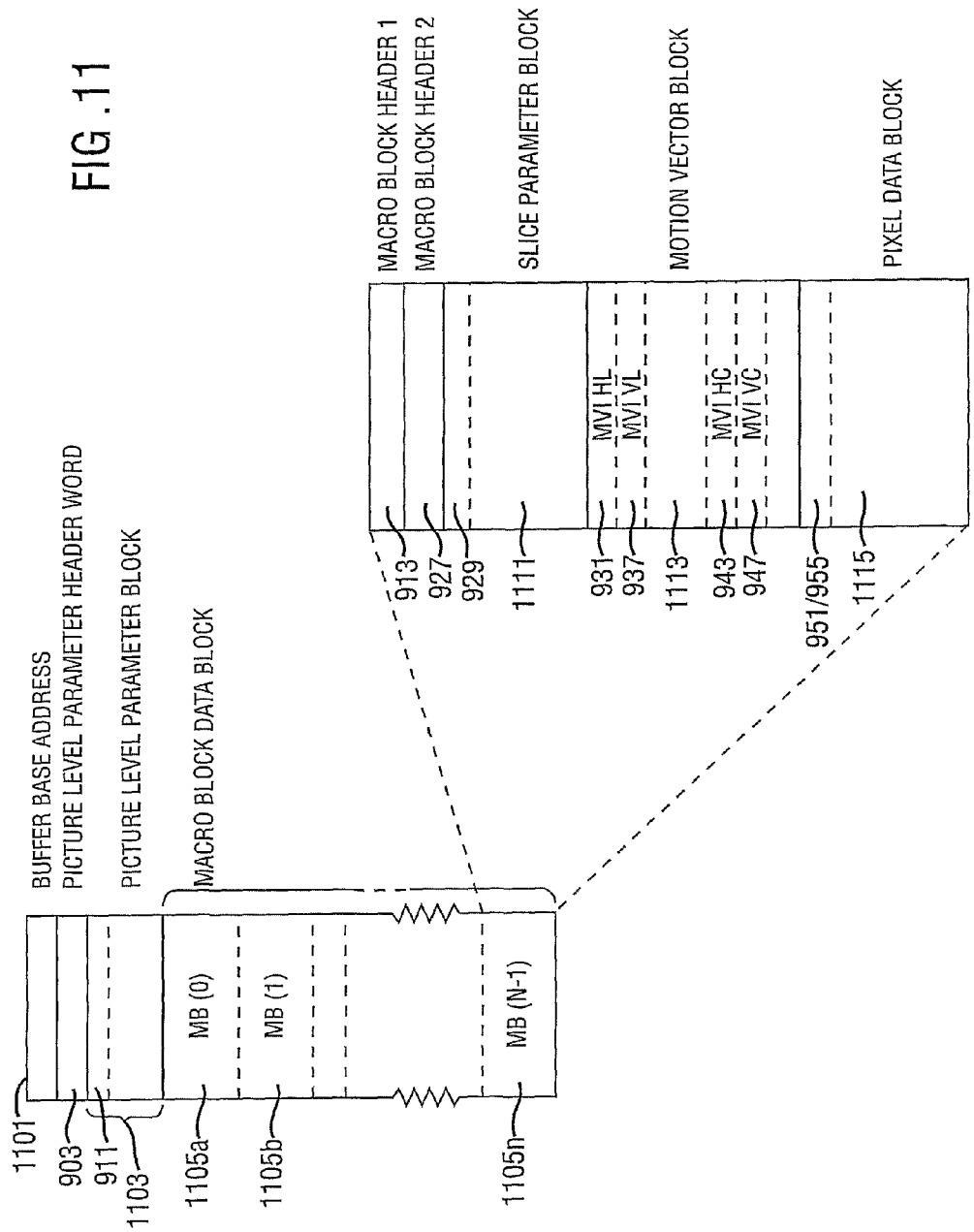
FIG. 11 shows a data structure for image data output from the data packer as shown in FIG. 8.

With reference to FIG. 11 the data structure of the final packet of data is further detailed. The packet 1101 comprises the picture level parameter header word 903, a picture level parameter block 1103 (which comprises the picture level parameter words 911), and a macro-block data block 1105.

The macro-block data block comprises a series of macro-block data elements 1105a to 1105n each of which define the macro blocks MB(0) to MB(N−1) respectively. A macro-block data element is shown in further detail also in FIG. 11.

A typical data element 1105n, comprises in order of storage, the macro-block header first word 913, the macro-block header second word 927, a slice parameter block 1111, a motion vector block 1113 and a pixel data block 1115.

The slice parameter block 1111, when it exists due to step 1010, comprises the slice parameter words 929 stored together in the same block.

The motion vector block 1113, when it exists due to step 1012, comprises the motion vector words 931, 937, 943, 947. The arrangement of these words as discussed previously is such that the luma motion vector words 931, 937 occur in the first part of the motion vector block 1113, and the chroma motion vector words 943, 947 occur in the second part of the motion vector block 1113.

The pixel data block 1115, when it exists due to steps 1014 or 1016 comprises either pixel data reference words 951 (where the macro-block is part of a intra macro-block), or pixel data residual words 955 (where the macro-block is a part of a predicted macro-block and the macro-block is not skipped).

The data packet is then output to the internal data interconnect 455.

Whereas in the 'synchronous' data connect embodiments, as detailed by the third and fourth embodiments of the present invention, the video data is processed by the predictor constructor 459 substantially as soon at it is received (with the possibility of being temporarily buffered by the memory management unit 453 or in the unpacker 683), the 'asynchronous' data connect embodiments pass the processed packets to the memory management unit 453 to be stored in the shared memory 501.

In the fifth embodiment the memory management unit therefore receives packet data from the data packer 457 and transmits the data packets to the shared memory 501 to a memory location as indicated by the data packet.

These data packets can then be read from the shared memory 501 when the VCP 519 is able to restore the predicted macro-blocks. The restoration and subsequent filtering, where required, of pictures is carried out in a manner similar to the handling of packetized data as detailed previously in the first embodiment of the present invention.

Thus such an embodiment allows the VDP to perform a series of picture decodes, which can be stored in the shared memory whilst the VCP performs the predicted picture reconstruction and possible in-loop filtering on previously decoded and fetched pictures. Thus as the VCP 'catches up' with processing the decoded pictures the VDP can be configured to perform other processing tasks—such as audio decoding.

A sixth embodiment of the present invention can further be described with respect to FIG. 4b, wherein the VDP implemented is shown schematically by FIG. 5c and the VCP implemented is shown schematically by FIG. 6b. In this sixth embodiment, the VCP 519 receives the data from the VDP 509 and transmits the data to the shared memory 501 without first packetizing it. Thus the VCP carries out the task of storing the VDP processed data but without packetizing it. The VCP also then requests the VDP processed data in the manner described earlier during the first embodiment of the present invention.

Thus the advantages of the fifth and sixth embodiments are that the VDP and VCP are linked by a direct interconnect that is not accessible by other shared components and therefore data can be passed directly within affecting the performance of the shared data transport system. Although being directly connected they are not synchronized to process data at the rate that picture production is synchronized and therefore the picture data is buffered by the shared memory. This allows both the VCP and VDP some flexibility in processing ability, including the ability to batch process data, store several pictures and then reconstruct the predicted pictures at a time convenient for the VCP.

It should be appreciated that further embodiments of the invention may be provided which combine different aspects of the described embodiments of the invention.

Embodiments of the present invention have been described in the context of MPEG. However it should be appreciated that embodiments of the invention can be used with any other type of video data.

Having thus described at least one illustrative embodiment of the invention, various alterations, modifications, and improvements will readily occur to those skilled in the art. Such alterations, modifications, and improvements are intended to be within the scope of the invention. Accordingly, the foregoing description is by way of example only and is not intended as limiting. The invention is limited only as defined in the following claims and the equivalents thereto.

What is claimed is:

1. A video decoding circuit comprising:
a first video data processor;
a second video data processor; and
a connection connecting said first video data processor and said second data processor;
wherein said first video data processor is arranged to receive a first signal comprising encoded video data, process said first signal to provide a second signal and output said second signal, said first video data processor being arranged to process said first signal dependent on at least part of said received first signal,
said second video data processor comprising a predictor constructor,
said second video data processor is arranged to receive at least a part of said second signal, process said at least a part of said second signal to provide a third signal, and output said third signal,
said second and third signals comprising a decoded video image stream, wherein a part of said second signal comprises coding standard information, said coding standard information indicating which of a plurality of encoding methods was used to encode the encoded video data, and
said second video data processor is arranged to process said at least part of said second signal dependent on the coding standard information such that:
when the coding standard information has a first value, the predictor constructor is configured to perform processing of at least part of the second signal based on a first decoded video format; and
when the coding standard information has a second value, different from the first value, the predictor constructor is configured to perform processing of at least part of the second signal based on a second decoded video format, different from the first decoded video format.

2. A circuit as claimed in claim 1, wherein said first video data processor is arranged to variable length decode said received first signal to produce a decoded first signal.

3. A circuit as claimed in claim 2, wherein said first video data processor is arranged to separate said first signal data into at least a first part and a second part,
wherein said first part comprises at least one of:
pixel data;
residual data, and
wherein said second part comprises motion vector data.

4. A circuit as claimed in claim 3, wherein said first video data processor is arranged to inverse quantize said first part of said first signal.

5. A circuit as claimed in claim 3, wherein said first video data processor is arranged to spatial domain transform said first part of said first signal.

6. A circuit as claimed in claim 4, wherein said first video data processor is arranged to combine said inverse quantized first part of said first signal with said second part of said first signal.

7. A circuit as claimed in claim 1, wherein said second video data processor is arranged to interpolate at least a first part of said second signal.

8. A circuit as claimed in claim 7, wherein said second video data processor is arranged to interpolate at least a first part of said second signal using one of horizontal and vertical interpolation.

9. A circuit as claimed in claim 8, further comprising a memory, said second video data processor being arranged to store said interpolated part of said second signal in said memory.

10. A circuit as claimed in claim 8, wherein said second video data processor is arranged to interpolate said stored interpolated first part of said second signal using the other one of horizontal and vertical interpolation.

11. A circuit as claimed in claim 7, wherein said second video data processor is arranged to combine said interpolated part of said second signal and a further part of said second signal, wherein said interpolated part of said second signal comprises an estimated macro block, and said further part of said second signal comprises residual error data.

12. A circuit as claimed in claim 1, wherein said second video data processor is arranged to filter at least one of said at least one part of said second signal and said third signal.

13. A circuit as claimed in claim 12 wherein said filter comprises at least one of a de-ringing filter and a deblocking filter.

14. A circuit as claimed in claim 1, wherein said coding standard information defines variations in the type of data.

15. A circuit as claimed in claim 14, wherein said connection comprises a bus connecting said first and second video data processors, and wherein the circuit further comprising a memory device, said memory device being connected to said bus.

16. A circuit as claimed in claim 15, wherein said first video data processor has an output for outputting said second signal to said memory device via said bus.

17. A circuit as claimed in claim 16, wherein said second video data processor has an input for receiving said parts of said second signal from said memory device via said bus.

18. A circuit as claimed in claim 1, wherein said connection comprises a data interconnect, said data
interconnect directly connecting said first video data processor and said second video data processor.

19. A circuit as claimed in claim 18, wherein said first video data processor has an output for outputting said second signal to said data interconnect.

20. A circuit as claimed in claim 18, wherein said second video data processor has an input for receiving said parts of said second signal from said data interconnect.

21. A circuit as claimed in claim 20, wherein said connection comprises a bus connecting said first and second video data processors and further comprising a memory device, said memory device being connected to said bus wherein said second video data processor receives part of said parts of said second signal from said data interconnect and part of said parts of said second signal from said bus.

22. A circuit as claimed in claim 1, wherein the coding standard information indicates a format of the encoded video data corresponding to the encoding method used to encode the encoded video, and wherein said first signal is at least one of:
a MPEG2 encoded video stream;
a H.263 encoded video stream;
a RealVideo9 encoded video stream;
a Windows media player encoded video stream;
a H.264 encoded video stream.

23. A circuit as claimed in claim 1, wherein said second signal comprises at least one of:
buffer base address word;
picture level parameter header word;
macro-block header word;
slice parameter word;
motion vector horizontal luma word;

motion vector vertical luma word;
motion vector horizontal chroma word;
motion vector vertical chroma word;
pixel data reference word and
pixel data residual word.

24. A circuit as claimed in claim 1, wherein said first video data processor comprises a data packer.

25. A circuit as claimed in claim 1, wherein said second video data processor comprises a data packer.

26. A circuit as claimed in claim 24, wherein said data packer comprises: an input, said input being arranged to receive said second signal, said second signal comprising data words; means for ordering said data words; and an output, said output being arranged to transmit data packets comprising ordered data words.

27. An integrated circuit comprising a circuit as claimed in claim 1.

28. A circuit as claimed in claim 1, wherein said first video data processor comprises a very long instruction word processor.

29. A circuit as claimed in claim 28, wherein said very long instruction word processor is adapted to process said first signal further dependent on a set of instructions stored in a memory.

30. A circuit as claimed in claim 1, wherein said second video data processor comprises a programmable processor.

31. A Digital Versatile Disc device comprising a circuit as claimed in claim 1.

32. An MPEG decoder comprising a circuit as claimed in claim 1.

33. A Digital Video Broadcasting device comprising a circuit as claimed in claim 1.

34. A circuit as claimed in claim 1, wherein the predictor constructor is arranged to process said at least part of said second signal dependent on the format of the data received by said second video data processor.

35. A circuit as claimed in claim 34, wherein the second signal comprises motion vector data, and the predictor constructor is arranged to process at least part of the motion vector data dependent on the format of the data received by said second video data processor.

36. A circuit as claimed in claim 1, wherein the second signal comprises motion vector data, and the predictor constructor is arranged to process at least part of the motion vector data dependent on the coding standard information received by said second video data processor.

37. A circuit as claimed in claim 5, wherein said first video data processor is arranged to combine said spatial domain transformed first part of said first signal with said second part of said first signal.

38. A video decoding method comprising the steps of:
receiving at a first video data processor a first signal comprising encoded video data,
processing said first signal to provide a second signal dependent on at least part of said first signal,
outputting said second signal,
receiving at least a part of said second signal at a second video data processor,
processing said at least part of said second signal by a predictor constructor within the second video data processor to provide a third signal, and
outputting said third signal,
wherein said second and third signals comprise a decoded video image stream,
wherein said step of outputting said second signal comprises the step of outputting coding standard information, the coding standard information indicating which of a plurality of encoding methods was used to encode the encoded video data, and
wherein said step of processing said at least part of said second signal is dependent on the coding standard information such that:
when the coding standard information has a first value, the predictor constructor is configured to perform processing of at least part of the second signal based on a first decoded video format; and
when the coding standard information has a second value, different from the first value, the predictor constructor is configured to perform processing of at least part of the second signal based on a second decoded video format, different from the first decoded video format.

39. A method as claimed in claim 38, wherein said step of processing said first signal comprises the step of variable length decoding said first signal.

40. A method as claimed in claim 38, wherein said step of processing said first signal comprises the step of separating said first signal into at least a first part and a second part,
wherein said first part comprises at least one of:
pixel data;
residual data, and
wherein said second part comprises motion vector data.

41. A method as claimed in claim 40, wherein said step of processing said first signal further comprises the step of inverse quantizing said first part of said first signal.

42. A method as claimed in claim 40, wherein said step of processing said first signal further comprises the step of spatial domain transforming said first part of said first signal.

43. A method as claimed in claim 41, wherein said step of processing said first signal further comprises the step of combining said inverse quantized first part of said first signal with said second part of said first signal.

44. A method as claimed in claim 42, wherein said step of processing said first signal further comprises the step of combining said spatial domain transformed first part of said first signal with said second part of said first signal.

45. A method as claimed in claim 38, wherein said step of processing at least a part of said second signal further comprises the step of interpolating at least a first part of said second signal.

46. A method as claimed in claim 45, wherein said step of interpolating at least a first part of said second signal comprises the step of interpolating at least a first part of said second signal using one of horizontal and vertical interpolation.

47. A method as claimed in claim 46, wherein said step of interpolating further comprises storing said interpolated part of said second signal.

48. A method as claimed in claim 46, wherein said step of interpolating further comprises interpolating said interpolated part of said second signal using the other one of horizontal and vertical interpolation.

49. A method as claimed in claim 48, wherein said step of receiving at least part of said second signal comprises receiving said at least part of said second signal directly from the first video data processor.

50. A method as claimed in claim 45, wherein said step of processing at least part of said second signal further comprises combining said interpolated part of said second signal and a further part of said second signal, wherein said interpolated part of said second signal comprises an estimated macro block, and said further part of said second signal comprises residual error data.

51. A method as claimed in claim 38, further comprising a further step of further processing at least a part of said second signal wherein said further processing step comprises the step of filtering, wherein said step of filtering comprises at least one of the steps:

de-ringing filtering and de-blocking filtering.

52. A method as claimed in claim 38, wherein said step of outputting said second signal further comprises the step of storing said second signal in a memory.

53. A method as claimed in claim 52, wherein said step of receiving at least part of said second signal comprises receiving a first part of said at least part of said second signal directly from said first video data processor and a second part of said at least part of said second signal from said memory.

54. A method as claimed in claim 38, wherein said step of processing said first signal further comprises the step of packetizing said second signal.

55. A method as claimed in claim 38, further comprising the steps of:

packetizing said at least part of said second signal;
storing said at least part of said second signal in a memory; and
receiving said at least part of said stored second signal from said memory.

56. The video decoding method as claimed in claim 38, wherein said coding standard information defines variations in the type of data.

57. A computer readable storage device comprising computer readable instructions, which, when executed by a processor, carry out a video decoding method comprising the steps of:

receiving at a first video data processor a first signal comprising encoded video data;
processing said first signal to provide a second signal dependent on at least part of said first signal;
outputting said second signal;
receiving at least a part of said second signal at a second video data processor;
processing said at least part of said second signal by a predictor constructor within the second video data processor to provide a third signal; and
outputting said third signal,
wherein said second and third signals comprise a decoded video image stream,
wherein said step of outputting said second signal comprises the step of outputting coding standard information, the coding standard information indicating which of a plurality of encoding methods was used to encode the encoded video data, and
wherein said step of processing said at least part of said second signal is dependent on the coding standard information such that:
when the coding standard information has a first value, the predictor constructor is configured to perform processing of at least part of the second signal based on a first decoded video format; and
when the coding standard information has a second value, different from the first value, the predictor constructor is configured to perform processing of at least part of the second signal based on a second decoded video format, different from the first decoded video format.

* * * * *